US010943197B1

(12) United States Patent
Li et al.

(10) Patent No.: US 10,943,197 B1
(45) Date of Patent: Mar. 9, 2021

(54) FLIGHT NUMBER OPTIMIZATION SYSTEM

(71) Applicant: AMERICAN AIRLINES, INC., Fort Worth, TX (US)

(72) Inventors: Jingrui Li, Grapevine, TX (US); Cumhur Alper Gelogullari, Lewisville, TX (US); Shau-Shiang Sunny Ja, Grapevine, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 174 days.

(21) Appl. No.: 16/100,046

(22) Filed: Aug. 9, 2018

Related U.S. Application Data

(60) Provisional application No. 62/543,209, filed on Aug. 9, 2017.

(51) Int. Cl.

| | |
|---|---|
| ***G06Q 10/06*** | (2012.01) |
| ***G06Q 10/04*** | (2012.01) |
| ***G06F 3/0484*** | (2013.01) |
| ***G06K 9/62*** | (2006.01) |
| ***G06Q 50/30*** | (2012.01) |

(52) U.S. Cl.
CPC ... *G06Q 10/06313* (2013.01); *G06F 3/04847* (2013.01); *G06K 9/6267* (2013.01); *G06Q 10/047* (2013.01); *G06Q 50/30* (2013.01)

(58) Field of Classification Search
None
See application file for complete search history.

(56) References Cited

U.S. PATENT DOCUMENTS

2010/0082394 A1* 4/2010 Pachon .................... G08G 5/00 705/7.29
2012/0035965 A1* 2/2012 Maguire ................ G06Q 10/02 705/5
2012/0174002 A1* 7/2012 Martin .................... G06F 9/451 715/763
2014/0052481 A1* 2/2014 Monteil ................ G06Q 10/02 705/5

* cited by examiner

*Primary Examiner* — Patricia H Munson
*Assistant Examiner* — Marjorie Pujols-Cruz
(74) *Attorney, Agent, or Firm* — Haynes & Boone, LLP

(57) ABSTRACT

A method of assigning numbers to flights includes displaying, in a first window that is displayed on a GUI, a slideable scale that receives a pairing preference input that indicates a user preference relating to the classification of flights as thru flights relative to the classification of flights as out-and-back flights. The method also includes: after displaying the first window, receiving by a processor the pairing preference input; in response to the receipt of the pairing preference input, classifying, using a flight number optimization model, each flight as one of: a thru flight, an out-and-back flight, and a stand-alone flight based on the pairing preference input; assigning, using the flight number optimization model, a number to each flight; and displaying, in a second window that is displayed on the GUI, at least a portion of an output schedule that comprises assigned numbers for each flight.

20 Claims, 18 Drawing Sheets

190

| Carrier | Current Avail. # Range | Previous Avail. # Range | Fos Partitions |
|---|---|---|---|
| AA Mainline | 1-399 | 1-399 | AA FOS |
| AA Mainline (LUS) | 400-899 | 400-899 | US FOS |
| AA Mainline | 900-1629 | 900-1629 | AA FOS |
| AA Mainline (LUS) | 1630-2174 | 1630-2174 | US FOS |
| AA Mainline | 2175-2754 | 2175-2754 | AA FOS |
| American Eagle -EV | 2755-3009 | 2755-3009 | ExpressJet (TE) |
| American Eagle -OO | 3010-3149 | 3010-3149 | Skywest (TE) |
| American Eagle - MQ | 3150-3769 | 3150-3769 | Envoy (MQ) |
| American Eagle - ZW (XS) | 3770-4144 | | Air Wisconsin (XS) |
| American Eagle - ZW (TE) | | 3770-4144 | Air Wisconsin (TE) |
| American Eagle - AX | 4145-4219 | 4145-4219 | Trans States (TE) |
| American Eagle - YX (XS) | | | Republic (XS) |
| American Eagle - YX (TE) | 4220-4774 | 4220-4774 | Republic (TE) |
| American Eagle - PT (XS) | 4775-5014 | | Piedmont (XS) |
| American Eagle - PT (TE) | | 4775-5014 | Piedmont (TE) |
| American Eagle - OH (XS) | 5015-5609 | | PSA (XS) |
| American Eagle - OH (TE) | | 5015-5609 | PSA (TE) |
| American Eagle - YV | 5610-6004 | 5610-6004 | Mesa (TC) |
| American Eagle - CP | 6005-6099 | 6005-6099 | Compass (TF) |

| FLT_NR | EFF_DATE | REASON |
|---|---|---|
| 11 | 10/1/2001 | PUBLIC UNACCEPTANCE |
| 13 | 1/1/1989 | PUBLIC NON ACCEPTANCE |
| 77 | 10/1/2001 | PUBLIC UNACCEPTANCE |
| 191 | 1/1/1989 | PUBLIC UNACCEPTANCE (DL) |
| 261 | 3/2/2000 | PUBLIC UNACCEPTANCE (AS) |
| 319 | 3/5/2013 | OPERATIONAL REQUEST |
| 405 | 7/23/2013 | US MISHAP |
| 427 | 7/23/2013 | US MISHAP |
| 587 | 11/12/2001 | PUBLIC UNACCEPTANCE |
| 666 | 1/1/1989 | PUBLIC NON ACCEPTANCE |
| 737 | 6/1/1991 | OPERATIONAL REQUEST |
| 757 | 6/1/1991 | OPERATIONAL REQUEST |
| 767 | 6/1/1991 | OPERATIONAL REQUEST |
| 800 | 6/1/1998 | PUBLIC UNACCEPTANCE (TWA) |
| 911 | 10/1/2001 | PUBLIC UNACCEPTANCE |
| 965 | 1/1/1996 | PUBLIC UNACCEPTANCE (AA) |
| 1016 | 7/23/2013 | US MISHAP |

| Number Start | Number End | Equip | Equip Typ | Hub Airport | Hub Airport Type | Spoke Airport | Spoke Airport Type | Rule Type | Prohibited? |
|---|---|---|---|---|---|---|---|---|---|
| 1 | 9999 | * | * | AFSEAST | E | AFSWEST | E | * | 1 |
| 1 | 9999 | * | * | AFSEAST | E | LAX | S | * | 1 |
| 1 | 9999 | * | * | AFSWEST | E | AFSEAST | E | * | 1 |
| 1 | 9999 | * | * | AFSWEST | E | JFK | S | * | 1 |
| 1 | 9999 | * | * | AFSWEST | E | MIA | S | * | 1 |
| 1 | 9999 | * | * | DFW | S | HUBAA | E | HSH | 0 |
| 1 | 9999 | * | * | HUBAA | E | * | S | HSH | 0 |

| Eq Group Type | Equipment | Orig Group Type | Orig Group Code | Via1 Group Type | Via1 Group Code | Via2 Group Type | Via2 Group Code | Via3 Group Type | Via3 Group Code | Via4 Group Type | Via4 Group Code | Dest Group Type | Dest Group Code | Exception | Inclusive |
|---|---|---|---|---|---|---|---|---|---|---|---|---|---|---|---|
| S | * | S | * | S | * | S | * | S | * | S | * | S | * | 0 | 0 |
| S | * | S | * | S | * | S | * | S | * | S | - | S | * | 0 | 0 |
| S | * | S | * | S | * | S | * | S | - | S | - | S | * | 0 | 0 |
| S | * | S | * | S | * | S | - | S | - | S | - | S | * | 0 | 0 |
| S | * | E | 1NONUS | S | * | S | * | S | * | S | * | E | 1NONUS | 1 | 0 |
| S | * | E | 1NONUS | S | * | S | * | S | * | S | - | E | 1NONUS | 1 | 0 |
| S | * | E | 1NONUS | S | * | S | * | S | - | S | - | E | 1NONUS | 1 | 0 |
| S | * | E | 1NONUS | S | * | S | - | S | - | S | - | E | 1NONUS | 1 | 0 |

| 85a | 85b | 85c | 85d | 85e | 85f | 85g | 85h | 85i | 85j | 85k | 85l | 85m |
|---|---|---|---|---|---|---|---|---|---|---|---|---|
| New_Num | Eff Date | Dis Date | Freq | Dep_Arp | Dep_T | Arr_Arp | Arr_T | Equip | Range | Ref_Num | Old_Num | Note |
| AA 0001 | 15-Jul-16 | 15-Jul-16 | ....S.. | BOS | 6:00 | JFK | 7:11 | AA 32T | 1_399 900 | 1 | 1 | T |
| AA 0001 | 15-Jul-16 | 15-Jul-16 | ....S.. | JFK | 8:30 | LAX | 11:38 | AA 32T | 1_399 900 | 1 | 1 | T |
| AA 0002 | 15-Jul-16 | 15-Jul-16 | ....S.. | LAX | 9:00 | JFK | 17:29 | AA 32T | 1_399 900 | 2 | 2 | |
| AA 0003 | 15-Jul-16 | 15-Jul-16 | ....S.. | JFK | 12:45 | LAX | 15:45 | AA 32T | 1_399 900 | 3 | 3 | |
| AA 0004 | 15-Jul-16 | 15-Jul-16 | ....S.. | LAX | 11:30 | JFK | 20:04 | AA 32T | 1_399 900 | 4 | 4 | |
| AA 0005 | 15-Jul-16 | 15-Jul-16 | ....S.. | OKC | 5:12 | DFW | 6:14 | AA S80 | 1_399 900 | 5 | 5 | T |
| AA 0005 | 15-Jul-16 | 15-Jul-16 | ....S.. | DFW | 11:10 | HNL | 14:29 | AA 763 | 1_399 900 | 5 | 5 | T |
| AA 0006 | 15-Jul-16 | 15-Jul-16 | ....S.. | OGG | 17:44 | DFW | 6:00 | AA 763 | 1_399 900 | 6 | 6 | |
| AA 0007 | 15-Jul-16 | 15-Jul-16 | ....S.. | DFW | 9:05 | OGG | 12:13 | AA 763 | 1_399 900 | 7 | 7 | |
| AA 0008 | 15-Jul-16 | 15-Jul-16 | ....S.. | HNL | 17:25 | DFW | 6:02 | AA 763 | 1_399 900 | 8 | 8 | |
| AA 0009 | 15-Jul-16 | 15-Jul-16 | ....S.. | JFK | 7:00 | SFO | 10:17 | AA 32T | 1_399 900 | 9 | 9 | |
| AA 0010 | 15-Jul-16 | 15-Jul-16 | ....S.. | LAX | 21:15 | JFK | 5:53 | AA 32T | 1_399 900 | 10 | 10 | |
| AA 0012 | 15-Jul-16 | 15-Jul-16 | ....S.. | HAV | 13:40 | MIA | 14:40 | AA 38D | 1_399 900 | 9451 | 9451 | |
| AA 0014 | 15-Jul-16 | 15-Jul-16 | ....S.. | OGG | 21:50 | LAX | 5:59 | AA 32H | 1_399 900 | 14 | 14 | |
| AA 0015 | 15-Jul-16 | 15-Jul-16 | ....S.. | JFK | 8:15 | SFO | 11:31 | AA 32T | 1_399 900 | 15 | 15 | |
| AA 0016 | 15-Jul-16 | 15-Jul-16 | ....S.. | SFO | 12:30 | JFK | 21:22 | AA 32T | 1_399 900 | 16 | 16 | |
| AA 0017 | 15-Jul-16 | 15-Jul-16 | ....S.. | VVI | 8:58 | MIA | 15:58 | AA 75L | 1_399 900 | 922 | 922 | |
| AA 0018 | 15-Jul-16 | 15-Jul-16 | ....S.. | MIA | 22:20 | LPB | 4:56 | AA 75L | 1_399 900 | 922 | 922 | |
| AA 0019 | 15-Jul-16 | 15-Jul-16 | ....S.. | JFK | 11:30 | LAX | 14:30 | AA 32T | 1_399 900 | 19 | 19 | |
| AA 0020 | 15-Jul-16 | 15-Jul-16 | ....S.. | SFO | 15:00 | JFK | 23:47 | AA 32T | 1_399 900 | 20 | 20 | |
| AA 0021 | 15-Jul-16 | 15-Jul-16 | ....S.. | JFK | 19:00 | LAX | 22:16 | AA 32T | 1_399 900 | 21 | 21 | |
| AA 0022 | 15-Jul-16 | 15-Jul-16 | ....S.. | LAX | 15:30 | JFK | 0:05 | AA 32T | 1_399 900 | 22 | 22 | |
| AA 0023 | 15-Jul-16 | 15-Jul-16 | ....S.. | JFK | 22:30 | LAX | 1:47 | AA 32T | 1_399 900 | 23 | 23 | |
| AA 0025 | 15-Jul-16 | 15-Jul-16 | ....S.. | ORD | 17:05 | LAS | 19:01 | AA 38D | 1_399 900 | 25 | 25 | |
| AA 0026 | 15-Jul-16 | 15-Jul-16 | ....S.. | HND | 1:00 | LAX | 19:20 | AA 789 | 1_399 900 | 26 | 26 | |
| AA 0027 | 15-Jul-16 | 15-Jul-16 | ....S.. | LAX | 18:55 | HND | 22:30 | AA 788 | 1_399 900 | 27 | 27 | |
| AA 0028 | 15-Jul-16 | 15-Jul-16 | ....S.. | LAX | 22:45 | JFK | 7:22 | AA 32T | 1_399 900 | 28 | 28 | |

FIG. 11

| New_Num | Eff_Date | Dis_Date | Freq | Dep_Arp | Dep_T | Arr_Arp | Arr_T | Equip | Range | Ref_Num | Old_Num | Carr |
|---|---|---|---|---|---|---|---|---|---|---|---|---|
| AA 2172 | 22-Aug-17 | 4-Oct-17 | 1234567 | PHX | 9:55 | GEG | 12:35 | AA A19 | 400_899 1630_2174 | 1917 | 59 | LUS |
| AA 2172 | 6-Oct-17 | 27-Oct-17 | ....5.. | PHX | 9:55 | GEG | 12:35 | AA A19 | 400_899 1630_2174 | 1917 | 59 | LUS |
| AA 2172 | 5-Oct-17 | 29-Oct-17 | 1234.67 | PHX | 8:35 | IAH | 13:08 | AA A19 | 400_899 1630_2174 | 449 | 63 | LUS |
| AA 2172 | 2-Jun-17 | 21-Aug-17 | 1234567 | SFO | 15:56 | PHX | 17:55 | AA 321 | 400_899 1630_2174 | 556 | 308 | LUS |
| AA 2172 | 22-Aug-17 | 4-Oct-17 | 1234567 | GEG | 15:20 | PHX | 17:55 | AA A19 | 400_899 1630_2174 | 1917 | 60 | LUS |
| AA 2172 | 6-Oct-17 | 27-Oct-17 | ....5.. | GEG | 15:20 | PHX | 17:55 | AA A19 | 400_899 1630_2174 | 1917 | 60 | LUS |
| AA 2172 | 2-Jun-17 | 21-Aug-17 | 1234567 | PHX | 18:40 | MCI | 23:14 | AA A05 | 400_899 1630_2174 | 556 | 78 | LUS |
| AA 2172 | 5-Oct-17 | 29-Oct-17 | 1234.67 | IAH | 15:09 | PHX | 16:00 | AA A19 | 400_899 1630_2174 | 449 | 68 | LUS |
| AA 2173 | 6-Oct-17 | 27-Oct-17 | ....5.. | PHX | 8:35 | IAH | 13:08 | AA A19 | 400_899 1630_2174 | 449 | 63 | LUS |
| AA 2173 | 6-Oct-17 | 27-Oct-17 | ....5.. | IAH | 15:09 | PHX | 16:00 | AA A19 | 400_899 1630_2174 | 449 | 68 | LUS |
| AA 2173 | 5-Oct-17 | 29-Oct-17 | 1234.67 | RNO | 12:33 | PHX | 14:15 | AA A19 | 400_899 1630_2174 | 493 | 264 | LUS |
| AA 2173 | 5-Oct-17 | 29-Oct-17 | 1234.67 | PHX | 9:55 | RNO | 11:42 | AA A19 | 400_899 1630_2174 | 493 | 259 | LUS |
| AA 2173 | 2-Jun-17 | 21-Aug-17 | 1234567 | PHX | 8:35 | TPA | 15:25 | AA A05 | 400_899 1630_2174 | 523 | 43 | LUS |
| AA 2173 | 2-Jun-17 | 21-Aug-17 | 1234567 | TPA | 17:45 | PHX | 19:20 | AA A05 | 400_899 1630_2174 | 523 | 46 | LUS |
| AA 2174 | 2-Jun-17 | 21-Aug-17 | 1234567 | PHX | 8:35 | DSM | 13:22 | AA A19 | 400_899 1630_2174 | 1942 | 59 | LUS |
| AA 2174 | 5-May-17 | 1-Jun-17 | 1234567 | PHX | 9:55 | SJC | 11:47 | AA A05 | 400_899 1630_2174 | 504 | 314 | LUS |
| AA 2174 | 2-Jun-17 | 21-Aug-17 | 1234567 | DSM | 14:54 | PHX | 16:00 | AA A19 | 400_899 1630_2174 | 1942 | 62 | LUS |
| AA 2174 | 5-May-17 | 1-Jun-17 | 1234567 | SJC | 12:25 | PHX | 14:15 | AA A05 | 400_899 1630_2174 | 504 | 320 | LUS |
| AA 2174 | 22-Aug-17 | 1-Oct-17 | 1234567 | AUS | 15:29 | PHX | 16:00 | AA A19 | 400_899 1630_2174 | 2104 | 49 | LUS |
| AA 2174 | 2-Oct-17 | 29-Oct-17 | 1234.67 | AUS | 15:29 | PHX | 16:00 | AA A19 | 400_899 1630_2174 | 2104 | 49 | LUS |
| AA 2174 | 6-Oct-17 | 27-Oct-17 | ....5.. | PHX | 9:55 | RNO | 11:42 | AA A19 | 400_899 1630_2174 | 493 | 259 | LUS |
| AA 2174 | 6-Oct-17 | 27-Oct-17 | ....5.. | RNO | 12:33 | PHX | 14:15 | AA A19 | 400_899 1630_2174 | 493 | 264 | LUS |
| AA 2174 | 22-Aug-17 | 1-Oct-17 | 1234567 | PHX | 8:35 | AUS | 12:47 | AA A19 | 400_899 1630_2174 | 2104 | 43 | LUS |
| AA 2174 | 2-Oct-17 | 29-Oct-17 | 1234.67 | PHX | 8:35 | AUS | 12:47 | AA A19 | 400_899 1630_2174 | 2104 | 43 | LUS |
| AA 2264 | 12-Mar-17 | 29-Oct-17 | 1234567 | PHX | 20:05 | ONT | 21:18 | AA 38D | 1_399 900_1629 2175_2754 | 2264 | 249 | LAA |

| Operator | LAA | LUS | EV | OO | MQ |
|---|---|---|---|---|---|
| Range | 1_399,900_1629,2175_2754 | 400_899,1630_2174 | 2755-3009 | 3010-3149 | 3150-3769 |
| Ttl Nums | 1593 | 1071 | 253 | 140 | 617 |
| Ttl Flights | 2011 | 1319 | 181 | 150 | 869 |
| Ttl Nums Used | 798(50.1%) | 489(46.5%) | 88(34.8%) | 74(52.9%) | 408(66.1%) |
| O/Bs | 130 | 115 | 28 | 16 | 88 |
| Thrus | 619 | 360 | 60 | 58 | 320 |
| Matched with Ref | 57.2% | 53.1% | 56.4% | 56.0% | 53.8% |

| Operator | LAA | LUS | EV | OO | MQ |
|---|---|---|---|---|---|
| Range | 1_399,900_1629,2175_2754 | 400_899,1630_2174 | 2755-3009 | 3010-3149 | 3150-3769 |
| Ttl Nums | 1593 | 1071 | 253 | 140 | 617 |
| Ttl Flights | 2011 | 1319 | 181 | 150 | 869 |
| Ttl Nums Used | 1506(94.5%) | 741(61.2%) | 126(49.8%) | 98(70%) | 589(95.4%) |
| O/Bs | 235 | 96 | 33 | 50 | 238 |
| Thrus | 180 | 439 | 23 | 2 | 36 |
| Matched with Ref | 97.7% | 95.9% | 98.3% | 100.0% | 99.2% |

| Carrier | Ttl Num | Ttl Flights | Ttl Num Used | Used Percent | Thrus | O/Bs | Matched with Ref |
|---|---|---|---|---|---|---|---|
| LAA | 1698 | 2127 | 1577 | 92.90% | 208 | 334 | 99.90% |
| LUS | 1040 | 1274 | 889 | 85.50% | 200 | 174 | 99.80% |
| EV | 125 | 140 | 97 | 77.90% | 16 | 25 | 100% |
| OO | 334 | 149 | 103 | 31% | 6 | 40 | 100% |
| MQ | 619 | 808 | 553 | 89.40% | 4 | 250 | 100% |
| ZW | 478 | 345 | 232 | 48.70% | 0 | 111 | 100% |
| AX | 70 | 92 | 62 | 89.20% | 5 | 24 | 100% |
| YX | 390 | 424 | 298 | 76.40% | 1 | 125 | 100% |
| PT | 239 | 222 | 148 | 61.90% | 1 | 73 | 100% |
| OH | 693 | 810 | 549 | 79.30% | 4 | 256 | 100% |
| YV | 294 | 365 | 270 | 91.80% | 14 | 80 | 100% |
| CP | 95 | 104 | 68 | 71.70% | 0 | 36 | 100% |

| New_Num | Eff_Date | Dis_Date | Freq | Dep_Arp | Dep_T | Arr_Arp | Arr_T | Equip | Range | Ref_Num | Old_Num |
|---|---|---|---|---|---|---|---|---|---|---|---|
| AA 2166 | 18-Jun-17 | 18-Jun-17 | ......7 | CLT | 0:15 | MCI | 1:36 | AA A19 | 400_899 1630_2174 | 580 | 580 |
| AA 2171 | 17-Jun-17 | 17-Jun-17 | .....6. | BDL | 21:05 | CLT | 23:13 | AA A19 | 400_899 1630_2174 | 872 | 872 |
| AA 2166 | 18-Jun-17 | 18-Jun-17 | ......7 | BDL | 21:05 | CLT | 23:13 | AA A19 | 400_899 1630_2174 | 872 | 872 |
| AA 0874 | 17-Jun-17 | 17-Jun-17 | .....6. | TPA | 21:15 | CLT | 22:57 | AA 19W | 400_899 1630_2174 | 874 | 874 |
| AA 2167 | 18-Jun-17 | 18-Jun-17 | ......7 | CLT | 9:35 | AUA | 13:35 | AA 320 | 400_899 1630_2174 | 874 | 874 |
| AA 0897 | 17-Jun-17 | 17-Jun-17 | .....6. | MSY | 20:10 | CLT | 23:09 | AA A19 | 400_899 1630_2174 | 897 | 897 |
| AA 2172 | 17-Jun-17 | 17-Jun-17 | .....6. | CLT | 11:25 | LIR | 13:35 | AA 320 | 400_899 1630_2174 | 1859 | 1859 |
| AA 2170 | 17-Jun-17 | 17-Jun-17 | .....6. | NAS | 12:45 | PHL | 15:46 | AA 19W | 400_899 1630_2174 | 1912 | 1912 |
| AA 2172 | 18-Jun-17 | 18-Jun-17 | ......7 | NAS | 12:45 | PHL | 15:46 | AA 19W | 400_899 1630_2174 | 1912 | 1912 |
| AA 2168 | 18-Jun-17 | 18-Jun-17 | ......7 | CLT | 9:25 | POP | 12:25 | AA 320 | 400_899 1630_2174 | 1918 | 1918 |
| AA 2174 | 17-Jun-17 | 17-Jun-17 | .....6. | POP | 13:20 | CLT | 16:40 | AA 320 | 400_899 1630_2174 | 1918 | 1918 |
| AA 2174 | 17-Jun-17 | 17-Jun-17 | .....6. | CLT | 9:25 | POP | 12:25 | AA 320 | 400_899 1630_2174 | 1918 | 1918 |
| AA 2168 | 18-Jun-17 | 18-Jun-17 | ......7 | POP | 13:20 | CLT | 16:40 | AA 320 | 400_899 1630_2174 | 1918 | 1918 |
| AA 2171 | 17-Jun-17 | 17-Jun-17 | .....6. | BGI | 15:20 | CLT | 20:25 | AA 320 | 400_899 1630_2174 | 1952 | 1952 |
| AA 1909 | 17-Jun-17 | 17-Jun-17 | .....6. | CLT | 22:30 | MEM | 23:16 | AA A19 | 400_899 1630_2174 | 2015 | 2015 |
| AA 2747 | 12-Jun-17 | 18-Jun-17 | 1234567 | DFW | 23:40 | MIA | 3:22 | AA 38D | 1_399 900_1629 2175_2754 | 2460 | 2460 |
| AA 2748 | 12-Jun-17 | 18-Jun-17 | 1234567 | MIA | 21:15 | PHX | 23:18 | AA 38D | 1_399 900_1629 2175_2754 | 2460 | 2460 |

| New_Num | Eff_Date | Dis_Date | Freq | Dep_Arp | Dep_T | Arr_Arp | Arr_T | Equip | Range | Ref_Num | Old_Num | Lock_Num | Reason |
|---|---|---|---|---|---|---|---|---|---|---|---|---|---|
| AA 4433 | 2-Jun-17 | 4-Jul-17 | 1234567 | NAS | 14:13 | MIA | 15:18 | AA E75 | 4385_4774 | 4433 | 4433 | 4433 | Internatio |
| AA 4457 | 3-Jun-17 | 1-Jul-17 | .....6. | NAS | 11:57 | DCA | 14:48 | AA R75 | 4385_4774 | 4457 | 4457 | 4457 | Internatio |
| AA 4505 | 7-Jun-17 | 28-Jun-17 | ..3.... | RTB | 12:22 | MIA | 16:35 | AA E75 | 4385_4774 | 4505 | 4403 | 4505 | Internatio |
| AA 4673 | 3-Jun-17 | 1-Jul-17 | .....6. | MIA | 15:35 | GGT | 16:52 | AA E75 | 4385_4774 | 4673 | 4547 | 4673 | Internatio |
| AA 4722 | 2-Jun-17 | 4-Jul-17 | 1234567 | FPO | 19:00 | MIA | 19:48 | AA E75 | 4385_4774 | 4722 | 4722 | 4722 | Internatio |
| AA 4507 | 2-Jun-17 | 4-Jul-17 | 1234567 | MIA | 10:40 | CZM | 11:31 | AA E75 | 4385_4774 | 4507 | 4436 | 4507 | Internatio |
| AA 4700 | 2-Jun-17 | 3-Jul-17 | 1.34567 | MIA | 12:50 | UR | 13:40 | AA E75 | 4385_4774 | 4700 | 4700 | 4700 | Internatio |
| AA 4555 | 3-Jun-17 | 1-Jul-17 | .....6. | FPO | 13:00 | PHL | 15:46 | AA R75 | 4385_4774 | 4555 | 4506 | 4555 | Internatio |
| AA 4692 | 2-Jun-17 | 4-Jul-17 | 1234567 | NAS | 15:30 | MIA | 16:35 | AA E75 | 4385_4774 | 4692 | 4692 | 4692 | Internatio |
| AA 4768 | 2-Jun-17 | 4-Jul-17 | 1234567 | MIA | 17:35 | MTY | 19:59 | AA E75 | 4385_4774 | 4768 | 4768 | 4768 | Internatio |
| AA 4701 | 2-Jun-17 | 4-Jul-17 | 1234567 | MIA | 20:10 | NAS | 21:16 | AA E75 | 4385_4774 | 4701 | 4701 | 4701 | Internatio |
| AA 4387 | 2-Jun-17 | 4-Jul-17 | 1234567 | MIA | 12:05 | GGT | 13:19 | AA E75 | 4385_4774 | 4387 | 4387 | 4387 | Internatio |
| AA 4763 | 2-Jun-17 | 4-Jul-17 | 1234567 | MTY | 8:00 | MIA | 12:29 | AA E75 | 4385_4774 | 4763 | 4643 | 4763 | Internatio |
| AA 4618 | 2-Jun-17 | 4-Jul-17 | 1234567 | CMW | 17:15 | MIA | 18:40 | AA E75 | 4385_4774 | 4618 | 4618 | 4618 | Internatio |
| AA 4458 | 2-Jun-17 | 4-Jul-17 | 1234567 | NAS | 6:25 | MIA | 7:27 | AA E75 | 4385_4774 | 4458 | 4458 | 4458 | Internatio |
| AA 4403 | 7-Jun-17 | 28-Jun-17 | ..3.... | MIA | 11:05 | RTB | 11:27 | AA E75 | 4385_4774 | 4403 | 4403 | 4403 | Internatio |

FIG. 17

FLIGHT NUMBER OPTIMIZATION SYSTEM

CROSS-REFERENCE TO RELATED APPLICATION

This application claims the benefit of the filing date of, and priority to, U.S. Application No. 62/543,209, filed Aug. 9, 2017, the entire disclosure of which is hereby incorporated herein by reference.

BACKGROUND

Generally, in commercial aviation, a flight is assigned a flight number that is used to identify the flight and that is listed on each passenger name record ("PNR") for the passengers scheduled to board the flight. Flights that form a two-flight "out and back" loop often have the same flight number, as do flights that form a loop between more than two airports, which are often referred to as thru flights. An "out and back" or OB flight is a flight from a first airport to a second airport that shares a flight number with a flight from the second airport to the first airport. A thru flight is a flight that forms a portion of a "loop" between airports. All the flights that form the loop between, such as for example Dallas, Chicago, Denver, and then back to Dallas share the same flight number. Often, an operating carrier is allowed to assign flight numbers within a number pool, which is a predetermined range of numbers. When the flight offerings and/or flight schedule changes, the flight number assignments must be updated while attempting to maintain flight number consistency over time. With over 6,000 flights daily, the designation of which flights are considered OB flights or thru flights, and the assignment of each flight with a flight number, take hundreds of man hours while producing a less than optimal flight number assignment schedule.

Attempts to automate the number reassignment process rely on single stage optimization, and take weeks or months to complete, if even possible. Using existing techniques, the scheduler does not have the ability to visualize the weighting of the flights as OB flights or as thru flights. Nor does the scheduler have the ability to specify the desired weighting of OB flights relative to thru flights. Existing automated models are not flexible enough to "solve" the number reassignment problem. That is, flights are assigned numbers outside of the number pool or are classified as a thru flight or an OB flight when the flight does not qualify for this classification. Often, the automated heuristic model cannot solve a problem that could be solved manually. Moreover, using the automated heuristic model, each flight is assigned a number individually and sequentially relative to other flights. Once the flight number is assigned to a flight, the automated heuristic model does not revisit that flight even if a "better" number for that flight is later found or identified. Additionally, existing automated models do not provide optimization information, such as for example, the minimum number of numbers needed, do not provide flexibility to use mixed thru and OB pairings, do not provide the ability to provide a preference for thru or OB flights, do not provide an option to maximum the number of flights that keep their previously assigned number, and do not provide a output schedule that spans multiple days.

BRIEF DESCRIPTION OF THE DRAWINGS

FIG. 5 is a table used by the system of FIG. 1 during the method of FIG. 3, according to an example embodiment.

FIG. 6 is another table used by the system of FIG. 1 during the method of FIG. 3, according to an example embodiment.

FIG. 7 is another table used by the system of FIG. 1 during the method of FIG. 3, according to an example embodiment.

FIG. 8 is another table used by the system of FIG. 1 during the method of FIG. 3, according to an example embodiment.

FIG. 11 is a portion of a results table created by the system of FIG. 1 during the method of FIG. 3, according to an example embodiment.

FIG. 12 is a portion of another results table created by the system of FIG. 1 during the method of FIG. 3, according to an example embodiment.

FIG. 13 is a results summary table created by the system of FIG. 1 during the method of FIG. 3, according to an example embodiment.

FIG. 14 is another results summary table created by the system of FIG. 1 during the method of FIG. 3, according to an example embodiment.

FIG. 15 is another results summary table created by the system of FIG. 1 during the method of FIG. 3, according to an example embodiment.

FIG. 16 is a portion of another results table created by the system of FIG. 1 during the method of FIG. 3, according to an example embodiment.

FIG. 17 is a portion of another results table created by the system of FIG. 1 during the method of FIG. 3, according to an example embodiment.

DETAILED DESCRIPTION

Figure 1:
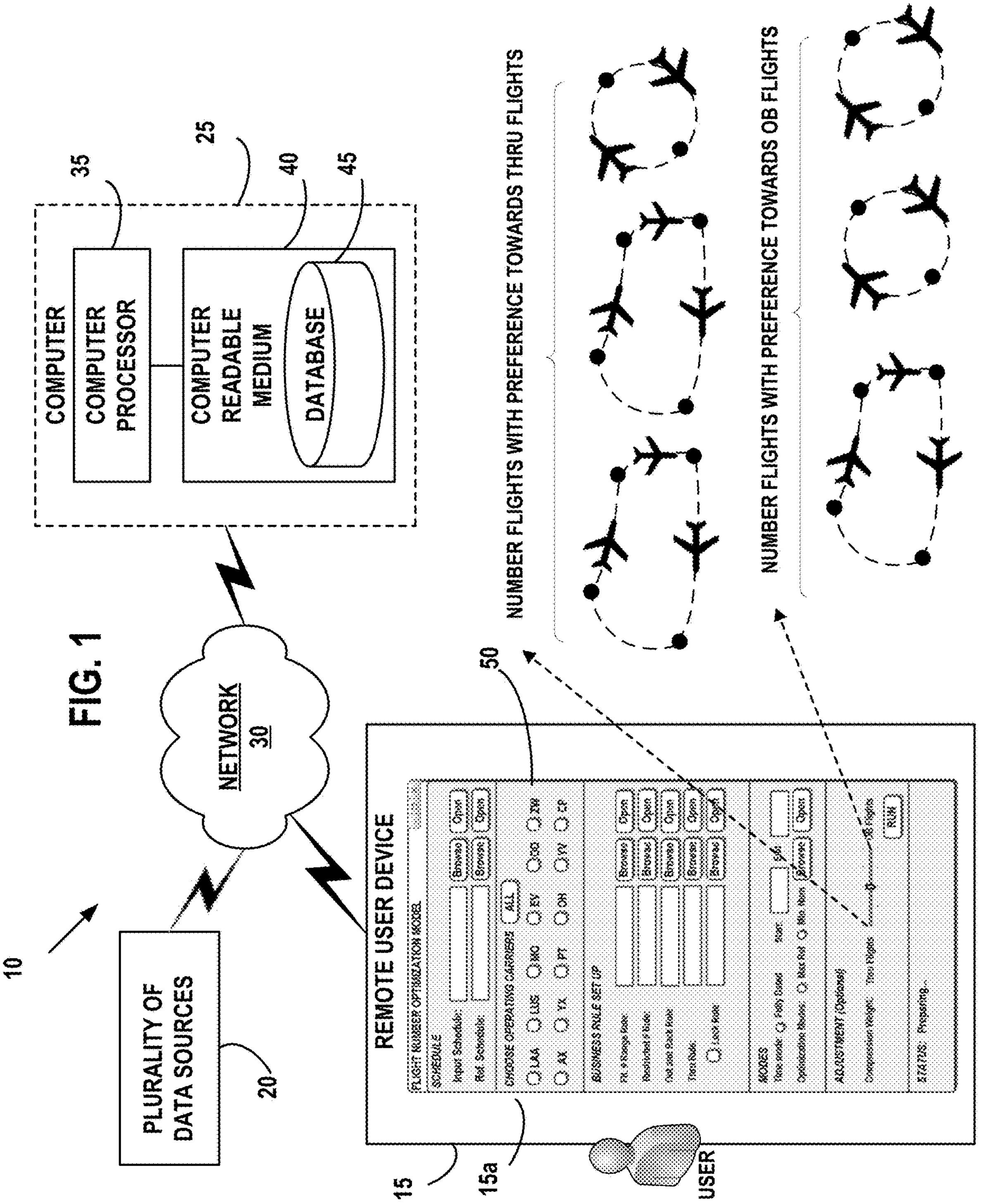
FIG. 1 is a diagrammatic illustration of a flight number optimization system, according to an example embodiment, the system including a computer and a graphical user interface configured to display a plurality of windows.

A system generally referred to by the reference numeral 10 as illustrated in FIG. 1 uses optimization methods to assign flight numbers to flights. Generally, flight numbers are limited to a maximum of four digits. The airline industry usually reserves specific ranges, or number pools, to different operating carriers. As the business grows, there are more and more flights offered by each operating carrier. At some point, it is difficult for all the flights to be assigned a number within the number pool. In some embodiments, the system 10 is a Flight Number Optimization System ("FNOS") that renumbers the flights using the numbers in the number pool and identifies certain flights as thru flights or OB flights.

In an example embodiment, as illustrated in FIG. 1, the system 10 includes one or more remote user devices 15; a plurality of data sources 20; and a computer 25 that are operably coupled together, and in communication via a network 30. Generally, the computer 25 includes a computer processor 35 and a computer readable medium 40 operably coupled thereto. Instructions accessible to, and executable by, the computer processor 35 are stored on the computer readable medium 40. A database 45 is also stored in the computer readable medium 40. Often, the remote user device 15 includes a graphical user interface ("GUI") 15*a* that is capable of displaying a plurality of windows or screens to a user. In an example embodiment, the user provides inputs to the system 10 via a window 50 that is displayed on the GUI 15*a*. In one embodiment, one of the inputs provided is an indication of the weight to be given to either thru flights or OB flights. Using this indication, the system 10 numbers the flights with either: a preference towards identifying flights as thru flights over OB flights, no preference for either thru flights or OB flights, or a preference towards identifying flights as OB flights over thru flights.

Figure 2:
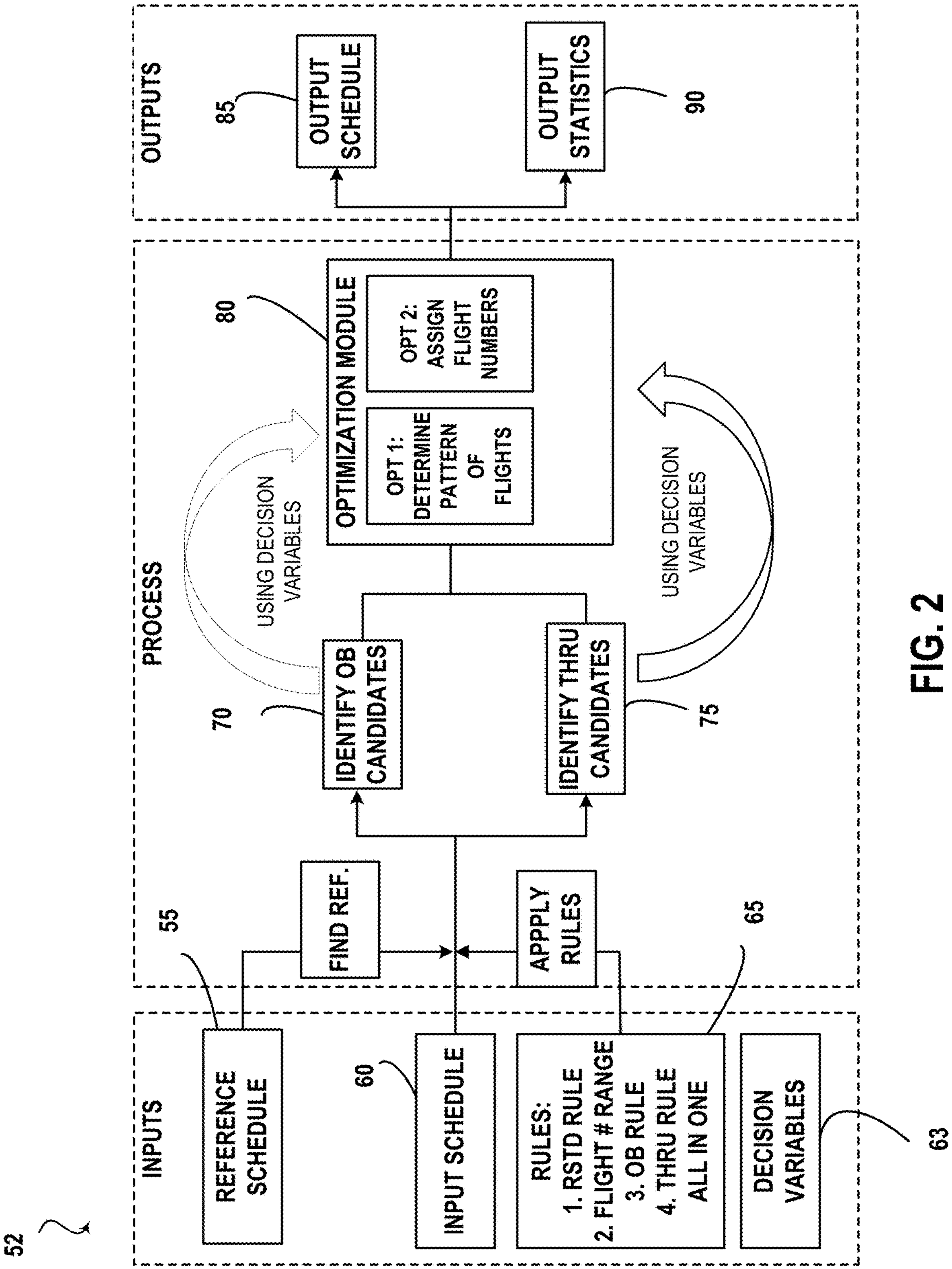
FIG. 2 is a data and process flow for the system of FIG. 1, according to an example embodiment.

In an example embodiment and referring to FIG. 2, an example data and process flow 52 of the system 10 is illustrated. In an example embodiment, the window 50 (illustrated in FIGS. 1 and 3) receives inputs for the system 10. The data inputs are generally a reference schedule 55, an input schedule 60, decision variables 63, and constraints or rules 65. In an example embodiment and after receiving the inputs, the system 10 identifies OB candidates 70 and thru candidates 75. In some embodiments, the OB candidates 70 and the thru candidates 75 are identified simultaneously. After identifying the OB candidates 70 and the thru candidates 75, the system 10 executes a two-stage optimization model 80 using the decision variables 63, then outputs an output schedule 85 and output statistics 90. The first stage of the two-stage optimization model determines the thru, OB, and stand-alone (neither thru nor OB) flights. The classification of flights as either thru, OB, or stand-alone creates a pattern of flights. The second stage of the two-stage optimization model assigns the flight numbers based on the classifications assigned in the first stage.

Figure 3:
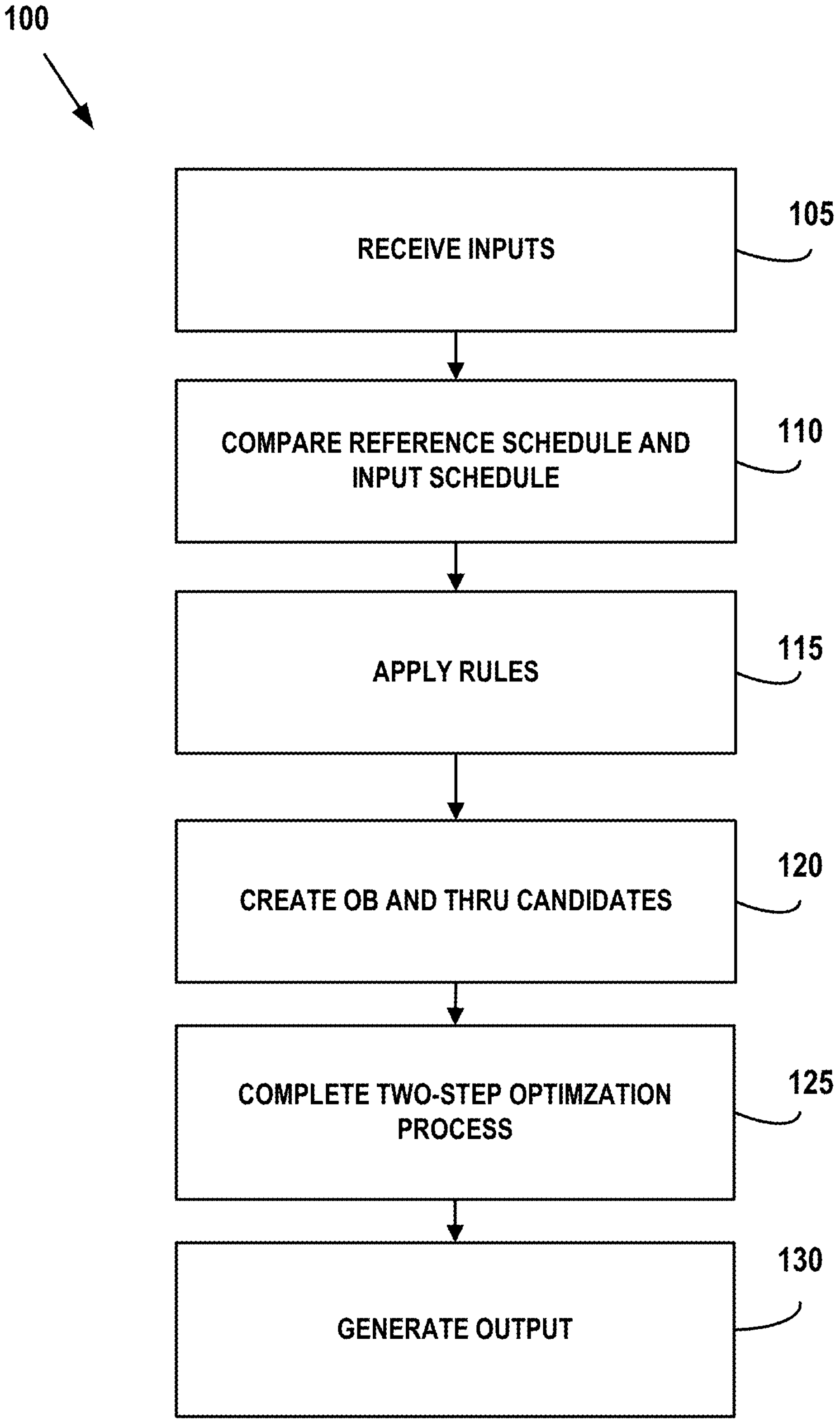
FIG. 3 is a flow chart illustration of a method of operating the system of FIG. 1, according to an example embodiment.

In an example embodiment, as illustrated in FIG. 3 with continuing reference to FIGS. 1 and 2, a method 100 of operating the system 10 includes receiving inputs via the window 50 at step 105; comparing the reference schedule 55 and the input schedule 60 to match flights in the input schedule 60 to flights in the reference schedule 55 at step 110; applying the rules 65 at step 115; creating the OB candidates 70 and the thru candidates 75 at step 120; completing the two-step optimization process at step 125; and generating output at step 130.

Figure 4:
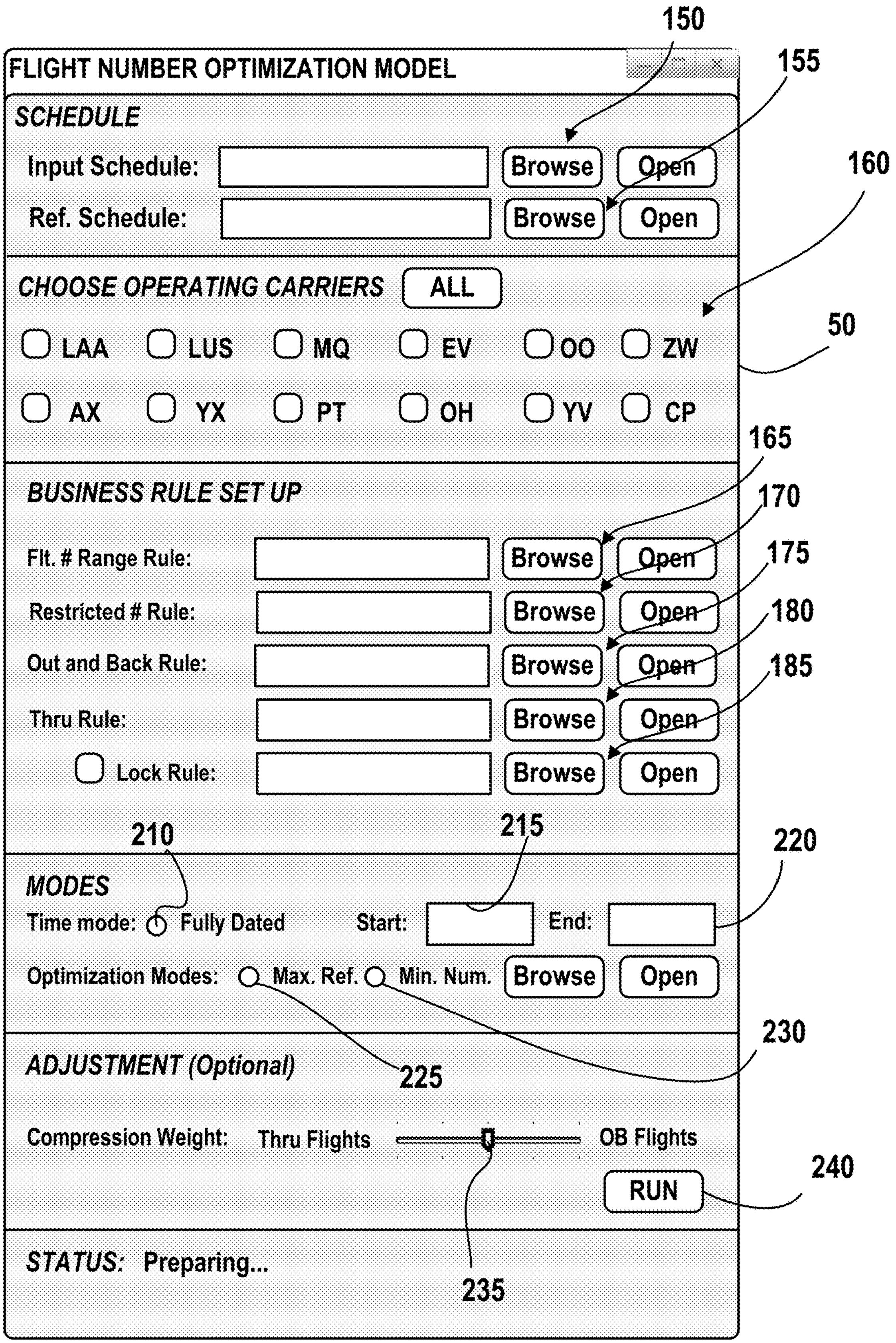
FIG. 4 is a window displayed by the graphical user interface of FIG. 1, according to an example embodiment, the window displaying a slideable scale.

At the step 105, inputs are received by the system 10 via the window 50. FIG. 4 is an illustration of one embodiment of the window 50. The window 50 is configured to receive a plurality of inputs. For example, the window 50 receives data relating to the Input Schedule 60 and the Reference Schedule 55 via file choosers 150 and 155, respectively.

In some embodiments, the input schedule 60 is stored as a table in a file that is capable of being uploaded to the system 10 and/or the location of which is identified via the file chooser 150. In some embodiments, the input schedule 60 is a non-final schedule for a future time period. In some embodiments, the input schedule 60 may be a "rough draft" of the final schedule and is often a past schedule that includes known changes. The known changes may be due to new flights being added, flights being removed, etc.

In some embodiments, the reference schedule 55 is stored as a table in a file that is capable of being uploaded to the system 10 and/or the location of which is identified via the file chooser 155. In some embodiments, the reference schedule 55 is a final schedule for a period of time prior to the time period detailed in the input schedule 60. For example, and assuming that the inputs are being received in August of 2017, the reference schedule 55 is a final schedule for the time period of September 2017 and the input schedule 60 is a schedule for the time period of October 2017, with the input schedule 60 being a marked-up version of the September 2017 schedule that reflects changes to flights, etc.

In one embodiment, the window 50 also receives data or input relating to operating carriers. A plurality of checkboxes 160, toggles or the like, can be chosen to designate one or more operating carriers for the system 10 to consider. The window 50 also receives inputs relating to rules 65. For example, the window 50 receives data relating to flight number range rule(s), restricted number rule(s), out and back rule(s), thru rule(s), and optional lock rule(s) via the file choosers 165, 170, 175, 180, and 185, respectively. In some embodiments, the system 10 identifies inputs via the window 50 or identifies the location of files that include the inputs via the file choosers 165, 170, 175, 180, and 185.

In some embodiments, the flight number range rule(s) are stored as a table in a file, such as .csv file. For example, and as illustrated in FIG. 5, the flight number range rule(s) are formatted in a table 190. However, a variety of files may be used and the flight number range rule(s) may be stored in a variety of databases that are not limited to tables. Regardless, the flight number range rule(s) designates a range of flight numbers that are available for assignment for each operator or carrier. For example, the range of flight numbers currently available for assignment for the carrier AA Mainline is 1-399, 900-1629, and 2175-2753. While the number range of 3770-4144 was previously available to the carrier of American Eagle—ZW (TE), the number range of 3770-4144 is currently available to the carrier of American Eagle—ZW (XS).

In some embodiments, the restrict number rule(s) are stored in a table in a file, such as a .csv file. For example, and illustrated in FIG. 6, the restrict number rule(s) are formatted in a table 195. The restrict number rule(s) list the flight numbers that are not available for assignment and the reason why they are not available.

In some embodiments, the out and back rule(s) are stored in a table in a file, such as a .csv file. For example, and illustrated in FIG. 7, the out and back rule(s) are formatted in a table 200. The out and back rule(s) specifies when an out and back is restricted, such as a pairing of cities, a timing between arrival and departure, etc.

In some embodiments, the thru rule(s) are stored in a table in a file, such as a .csv file. For example, and illustrated in FIG. 8, the thru rule(s) are formatted in a table 205. The thru rule(s) specifies which flights or destinations are restricted from being paired or grouped together to form a thru flight network or pairing.

Figure 9A:
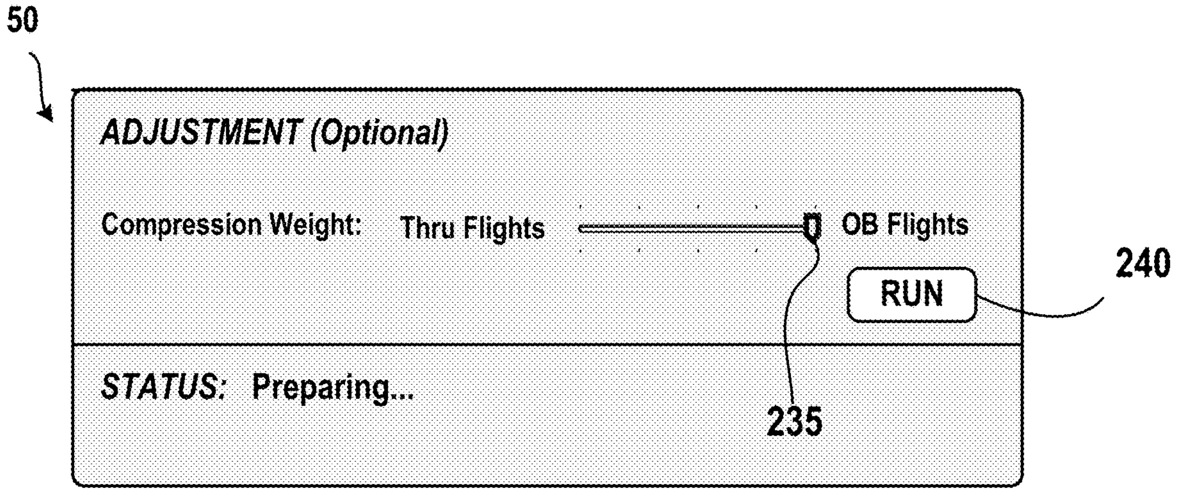
FIG. 9*a* is a portion of the window of FIG. 4 with the slideable scale in a first position, according to an example embodiment.
Figure 9B:
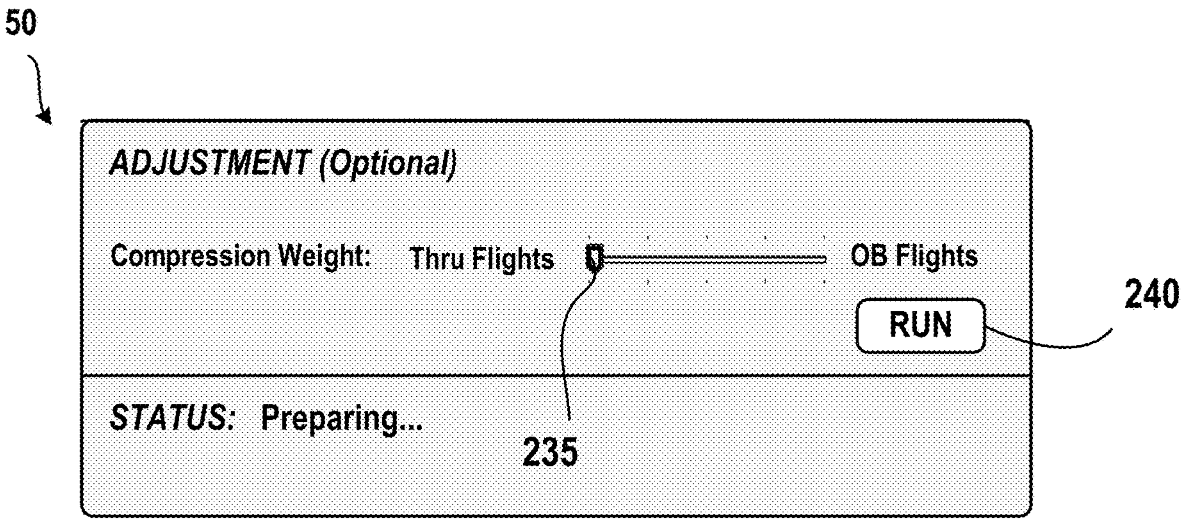
FIG. 9*b* is a portion of the window of FIG. 4 with the slideable scale in a second position, according to an example embodiment.

Turning back to FIG. 4, the window 50 also receives data regarding the mode of operation via inputs 210, 215, 220, 225, and 230. The system 10 generally operates in two modes. The first mode is "max ref", which is selectable via the input 225 and maximizes the number of flights that have flight numbers that match flight numbers in the reference schedule 55. The second mode is "min number", which is selectable via the input 230, minimizes the number of flight numbers needed and determines the minimum number of flight numbers needed. The window 50 also receives data or inputs regarding a compression weight via a slider or slideable scale 235. As illustrated in the portion of the window 50 illustrated in FIGS. 9*a* and 9*b*, the slideable scale 235 is movable within a range that includes a first extreme position associated with a strong preference for thru flights over OB flights and a second, opposing extreme position associated with a strong preference for OB flights over thru flights. In some embodiments, the slideable scale 235 may be replaced with a text box, drop down menu, or other visual element that allows the user to input an comparative value representing a preference for OB flights relative the a preference of thru flights. The compression weight slideable scale 235 allows a user to customize the proportions of thru flights to OB flights in the output schedule 85. That is, moving the slideable scale 235 to a far left-hand position directs the system 10 to maximize the number of thru flights while calculating the output schedule 85 and moving the slideable scale 235 to a far right-hand position directs the system 10 to maximize the number of OB flights while calculating the output schedule 85. The slideable scale 235 provides a visual representation to the scheduler (user of the window 50) of the weighting of the thru flights to OB flights in the output schedule 85 or at least the preferred weighting of the thru flights to OB flights in the output schedule 85.

Returning to FIG. 4, the window 50 also displays a run button 240 that initiates the calculation of the output schedule 85 and the output statistics 90. In some embodiments, the decision variables 63 are input into the system 10 via the inputs 210, 215, 220, 225, and 230.

While the window 50 includes file choosers 150, 155, 165, 170, 175, 180, and 185, which generally include a browse button that allows the user to access file locations, and a text box that displays a path to a selected file, other GUI elements and methods of identifying/uploading the data are considered. For example, the file choosers 150, 155, 165, 170, 175, 180, and 185 may be omitted and a "drag and drop" file identification/uploading element may be displayed on the window 50. Alternatively, in some embodiments, the window 50 prompts the user for confirmation that the most recent final schedule should be used as the "Ref. Schedule" without the user having to find or select a file for identification and/or upload to the system 10. Similar options are considered for the file choosers 150, 165, 170, 175, 180, and 185. Moreover, the files identified or uploaded via the window 50 may be stored within the remote user device 15, within the computer 25, and/or within the plurality of data sources 20. For example, the window 50 may be displayed on the GUI 15*a* of the remote user device 15, but the data identified and/or selected via the window 50 may be located at a location that is remote from the remote user device 15. In some embodiments, the remote user device 15 forms a portion of the computer 25.

Turning back to FIG. 3 and at the step 110, the input schedule 60 is compared to the reference schedule 55 to match flights in the input schedule 60 to flights in the reference schedule 55 or to the closest flight in the reference schedule 55. Maintaining consistency in flight numbers between the input schedule 60 and the reference schedule 55 reduces the amount of PNR changes due to a flight number change, which reduces costs associated with making these PNR changes. In some embodiments, the system 10 performs hierarchy matching between flights in the input schedule 60 that are not identical, but similar to, the flights in the reference schedule 55. This matching is hierarchy matching with the following ranking: 1) from/to airport, subfleet, and 30-minute window; 2) from/to airport, and 30-minute window, 3) from/to airport, subfleet, and 60-minute window, and 4) from/to airport, and 60-minute window. For example, if there are two flights in the input schedule 60 that do not have an identical match to a flight in the reference schedule 55, but are similar to a flight in the reference schedule 55 in that both are from/to the same airport and within a 30-minute window compared to the flight in the reference schedule, the flight that is in the same subfleet as the flight in the reference schedule will be matched with the flight in the reference schedule 55 if the other flight is not in the same subfleet as the flight in the reference schedule. In one embodiment, the system 10 identifies flights in the input schedule 60 that do not have a match with a flight in the reference schedule 55.

At the step 115, the system 10 applies the rules 65. For example, and when the available number range has changed, the system 10 identifies flights in the input schedule 60 that were matched with flights from the reference schedule 55 that are now outside of the available number range. The system 10 also identifies any flight numbers that are restricted flight numbers.

At the step 120, the OB candidates and the thru candidates are identified or created. During the step 120, all possible thrus and out-and-backs are generated and identified. As noted above, an OB flight has a corresponding flight with an opposite departure/arrival destination. That is, a flight from DFW to LAX and a flight from LAX to DFW form an out and back loop, or pairing, between Dallas and Las Angeles. The DFW to LAX flight is one OB flight associated with the Dallas to Las Angeles out and back loop, and the LAX to DFW flight is the other. Generally, an OB flight shares a flight number with its associated return flight. A thru pairing is a grouping of flights that often share the same aircraft and depart from a home airport and return to the home airport while stopping at different airports during the thru pairing. For example, an aircraft departs from Dallas and stops in Chicago and Miami before returning to Dallas. The flights within the thru pairing or "loop" share a flight number. The designation of a flight as an OB or a thru flight reduces the number of flight numbers required to cover all the flights. That is, if there are 6,000 flights and each are given a unique flight number, then 6,000 flight numbers would be required. However, if some flights share a flight number via designating it an OB or thru flight, then the number of required flight numbers is reduced to 3,500 or even less. Generally, the system 10 creates OB candidates and the thru candidates based on a minimum/maximum connection time and thru/OB rules received or identified via the window 50. That is, to be considered an OB pairing, a minimum connection time is required between the two flights. Also, and in some embodiments, no thru pairing can be created when the loop includes five or fewer flights. In other embodiments, no thru pairing can be created when the loop includes five or more flights. In some embodiments, the system 10 identifies all potential OB pairings and thru flight pairings simultaneously.

At the step 125, the system 10 completes a two-step optimization process. Turning back to FIG. 2, the system 10 implements a first optimization, which determines the pattern of flights (e.g., number of stand-alone or one way flights, number of thru pairings, and number of out-and-back pairings), and implements a second optimization, which assigns the flight numbers to the stand-alone flights, the thru flights, and the out-and-back flights. In some embodiments and during the first optimization, the system 10 determines the thru, OB, and stand-alone flights with the goal of keeping the pattern in the reference schedule 55 when the system 10 is on "Max. Ref" mode and with the goal of minimizing the number of numbers used when the system 10 is on "Min. Num." mode. Generally, during the first optimization, the optimization uses the following constraints: 1) each flight stands alone or is part of a thru pairing or part of an OB pairing, 2) networks must be validated, and 3) the number of combinations (e.g., stand-alone flights, thru pairings, and OB pairings) cannot exceed the number of available flight numbers. In some embodiments, the system 10 implements a mixed-integer program formulation during the first optimization. In an example embodiment, the mixed-integer program used at the step 125 can be described as follows: Objective Function when the system 10 is in the "Max. Ref." mode:

$$\text{Min}\sum_{f\in F}\left(\left|\text{Single}[f]-\overline{\text{Single}[f]}\right|+\sum_{j\in J_T}\left|TCnnt[f][j]-\overline{TCnnt[f][j]}\right|+\sum_{j\in J_{OB}}\left|OBCnnt[f][j]-\overline{OBCnnt[f][j]}\right|\right)*P[f] \quad (1)$$

Objective Function when the system 10 is in the "Min. Num." mode:

$$\text{Min } \Sigma_{f\in F}(\text{Single}[f]+T\text{Start}[f]+\Sigma_{j\in J_{OB}}OB\text{Cnnt}[f][j]) \quad (2)$$

Where

F=Set of all valid flights

P[f]=Penalty if the flight f does not match the reference $C_T$=Set of thru connections $C_{OB}$=Set of out and back connections With decision variables:

$$\text{Single}[f]=\begin{cases}0-\text{flight } f \text{ is not a single flight,}\\1-\text{flight } f \text{ is a single flight}\end{cases}$$

$$TStart[f]=\begin{cases}0-\text{flight } f \text{ is not a thru start,}\\1-\text{flight } f \text{ is a thru start}\end{cases}$$

$$TEnd[f]=\begin{cases}0-\text{flight } f \text{ is not a thru end,}\\1-\text{flight } f \text{ is a thru end}\end{cases}$$

$$TCnnt[i][j]=\begin{cases}0-\text{thru flight } i \text{ to flight } j \text{ is not used,}\\1-\text{thru flight } i \text{ to flight } j \text{ is used}\end{cases}$$

$$i,\ j\in C_T$$

$$OBCnnt[i][j]=\begin{cases}0-OB\text{ flight } i \text{ to flight } j \text{ is not used,}\\1-OB\text{ flight } i \text{ to flight } j \text{ is used}\end{cases}$$

$$i,\ j\in C_{OB}$$

Subject to the following constraints:

$$\text{Single}[f]+T\text{Start}[f]+\Sigma_{i\in I_T}T\text{Cnnt}[i][f]+\Sigma_{i\in I_{OB}}OB\text{Cnnt}[i][f]+\Sigma_{i\in J_{OB}}OB\text{Cnnt}[f][i]=1 \quad (3)$$

$$\forall f\in F,\ \forall n\in N$$

Where $I_T$=Set of all eligible pre thru flights for flight f $I_{OB}$=Set of all eligible Pre out and back flights for flight f $$\text{Single}[f]+T\text{End}[f]+\Sigma_{i\in J_T}T\text{Cnnt}[f][j]+\Sigma i\in I_{OB}OB\text{Cnnt}[i][f]+\Sigma_{j\in J_{OB}}OB\text{Cnnt}[f][i]=1 \quad (4)$$

$$\forall f\in F$$

Where

J=Set of all eligible post flights for flight f $$T\text{Start}[f]+T\text{End}[f]\leq 1 \quad (5)$$

$$\forall f\in F$$

$$\Sigma_{f\in F}(\text{Single}[f]+T\text{Start}[f]+\Sigma_{j\in J_{OB}}OB\text{Cnnt}[f][j])\leq \text{Available Numbers} \quad (6)$$

The objective function (1) is to keep the pattern and/or assigned numbers in the reference schedule if possible. The objective function (2) is to minimize the number of numbers used or the number of patterns created during the optimization. Constraint sets (3) and (4) ensure that each flight is a stand-alone, or is part of a thru or part of an out-and-back flight by requiring the inbound or each flight be one and the outbound for each flight be one. Constraint set (5) is a constraint for the thru validation. That is, a flight cannot be the start or the end of a thru pairing at the same time. Constraint set (6) is a constraint set that ensures the number of combinations (stand alone, thru, or OB) cannot exceed the number of available flight numbers.

In some embodiments, the system 10 implements a mixed-integer program formulation during the second optimization with the goal of minimizing the differences between the output schedule 85 and the reference schedule 55. In an example embodiment, the mixed-integer program used at the step 125 can be described as follows:

Objective Function:

$$\text{Min}\sum_{n\in N}\sum_{c\in C}\left(X[n][c]-\overline{X[n][c]}\right) \quad (7)$$

Where

F=Set of all flight numbers

C=Set of all combinations (single/thru/OB, result from model 1)

With decision variables:

$$X[n][c]=\begin{cases}0-\text{combination } c \text{ does not use flight number } n,\\1-\text{combination } c \text{ uses flight number } n\end{cases}$$

$$n\in N,\ c\in C$$

Subject to the following constraints:

$$\Sigma_{n\in N}X[n][c]= \quad (8)$$

$$\forall c\in C$$

$$\Sigma_{c\in C}X[n][c]\leq 1 \quad (9)$$

$$\forall n\in N$$

The objective function (7) is to minimize the differences between the output schedule 85 and the reference schedule 55. Constraint set (8) ensures that each combination only has one number. Constraint set (9) ensures that each number can have at most one combination.

Figure 10:
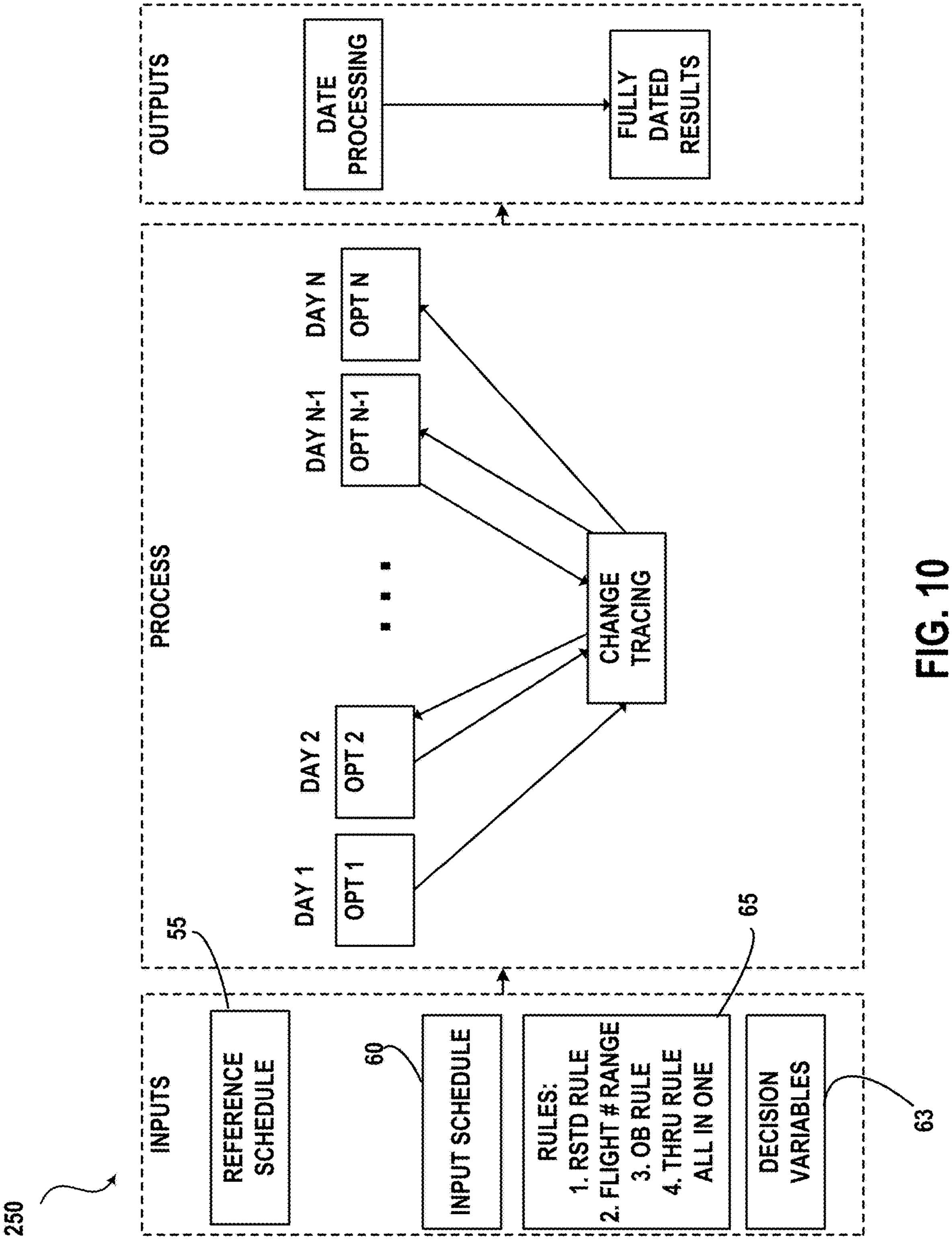
FIG. 10 is another data and process flow for the system of FIG. 1 during the method of FIG. 3, according to an example embodiment.

In some embodiments, the system 10 uses the decision variables 63 input via the window 50 to complete the first and/or second optimization. In some embodiments and as illustrated by the data and process flow 250 of FIG. 10, the system 10 uses a change tracing process that looks at historical flight number assignments. In some embodiments, the change tracing process includes identifying: a reference number needed on a specific day, a used number on that day, any number changes for previous days, a reference number on adjacent days, and a reason that a new number does not match with the reference for all days (e.g., broken thrus, incorrect range, etc.). Using the data and process flow 250, the system 10 assigns numbers for multiple days. During the step 125, the system 10 determines if it possible to assign flight numbers to the flights considered, given all the rules 65 and restrictions. The system 10 also identifies the minimum set of numbers needed for the set of flights considered and the maximum set of flights a number pool can handle. Moreover, the system 10 considers all possible combinations of OB, thru flights, and stand-alone flights, treats the problem as a whole, and chooses the best assignment that satisfies the optimization goal as defined by the decision variables 63. In one embodiment, the system 10 uses the result from the first optimization to assign the correct number to all flights simultaneously.

At the step 130, the system 10 generates the output. FIG. 11 is an illustration of a portion of the output schedule 85. In an example embodiment, the output schedule 85 is presented in a table format with headings such as new number 85*a*, effective date 85*b*, discontinue date 85*c*, frequency 85*d*, departure airport 85*e*, departure time 85*f*, arrival airport 85*g*, arrival time 85*h*, equipment (aircraft) 85*i*, range 85*j*, reference flight number 85*k*, old (input) number 85*l*, and note 85*m*. In an example embodiment, the new number 85*a* is the flight number assigned to a flight using the system 10, the effective date is a date on which the flight is assigned the new flight number, the discontinue date is a date on which the flight is no longer assigned the new flight number, the frequency 85*d* is a number corresponding to a specific day of the week (e.g., 1 for Sunday, 2 for Monday), the departure airport 85*e* is the airport from which the flight departs (starting point of flight), the departure time 85*f* is the time at which the flight departs, the arrival airport 85*g* is the airport at which the flight arrives (ending point of flight), the arrival time 85*h* is the time at which the flight arrives, the equipment 85*i* corresponds to an aircraft which is used during the flight, the range 85*j* is the range of flight numbers in which the flight number should be within, the reference number 85*k* is the flight number used for the flight in the reference schedule 55, the old number 85*l* is the flight number listed for the flight in the input schedule 60, and the note 85*m* relates to a note, such as for example a T for a thru flight and a O or OB for an OB flight. In an example embodiment, the system 10 determines which flights are designated as OB flights and which flights are thru flights. As illustrated in FIG. 11, the output schedule is a daily schedule for the day of the week associated with the Frequency of 5 (e.g., Thursday). FIG. 12 illustrates a portion of the output schedule 85 that is a fully dated schedule. That is, the frequency includes 5 but also 1-4, 6, and 7. Thus, it is a fully dated output schedule 85. In one embodiment, the note 85*m* is omitted and a heading 85*o* that lists the carrier associated with each flight is provided. In some embodiments, the output schedule 85 and/or the output statistics 90 are displayed in a window on the GUI 15*a*.

As the output schedule 85 is generated based on the decision variables 63 received via the window 50, the number assignments can vary depending on the mode selected and the compression weight for the thru/OB flights. For example, and when the "Min. Num." mode is selected via the input 230, the system 10 minimizes the amount of numbers used in the available range of numbers. FIG. 13 is an illustration of the output statistics 90 when the "Min. Num." mode has been selected. As can be seen in FIG. 13, the maximum total numbers used from the reference schedule 55 is 66.1% (for MQ) or below. As the goal of the optimization is to minimize the number of numbers used, the number of flights in the output schedule 85 that have different numbers than the reference schedule 55 is also low (i.e., max of 57.2% for carrier LAA). FIG. 14 is an illustration of the output statistics 90 when the "Max Ref" mode is selected via the input 225 displayed in the window 50. As can be seen, the maximum total numbers used is now up to 95.4% but the matched with ref. is 95.9% and higher. FIG. 15 is an illustration of the output statistics 90 for a fully dated output schedule 85. The output statistics 90 include the percentage of flights in the output schedule 85 that match with the reference schedule 55, the number of thru pairings and number of out and back pairings, the carrier, the total number of numbers available in the number pool, the total flights, the total numbers used, and the percent of available numbers used from the number pool. In some embodiments, the system 10 also produces a change report. For example, and as illustrated in the table 255 in FIG. 16, a listing of the flights in the output schedule 85 that have "new" numbers or numbers that do not match with flights in the reference schedule 55 is provided by the system 10. This listing of the flights can be used to update PNR records, etc. In some embodiments, the system 10 also produces a lock report. An example of a lock report is illustrated in FIG. 17 as table 260. In some embodiments, the output schedule 85, the output statistics 90, the table 255, and/or the table 260 are stored as an SSIM output that can be uploaded to AirVision directly and/or as a .csv file.

Using the system 10 and/or completing at least a portion of the method 100 solves a problem in the technical field of flight number assignment. Generally, the designation of flights as OB or thru flights and assignment of flight numbers is performed manually, which requires hundreds of man hours and results in a less than optimal flight number schedule. When performed manually, there is no ability to visualize or specify a desired weighting between OB flights and thru flights. Moreover, one problem with manually creating the flight number schedule is that the number of flight numbers required often exceeds the number of flight numbers available within the predetermined range of available flight numbers (due to less than optimal designation of thru and OB flights). When this occurs, a flight number is forced to be treated as a thru or OB flight even though it is not a valid OB or a valid thru flight. Additionally, a flight number for a regularly scheduled flight might change depending on the day or week, which can cause customer confusion. Moreover, the aircraft carrier is required to update PNRs affected by the change and notify the customers of changes to their PNRs. The updating of the PNRs and alerting of customers is expensive.

Attempts to automate the process using a single stage optimization takes weeks or months to complete, if even possible. Limitations in available memory to store the possible combinations required for a single stage optimization is also a limiting factor in successfully creating a flight number schedule using single stage optimization. Using existing techniques, the scheduler does not have the ability to visualize the weighting of the flights as OB flights or as thru flights. Nor does the scheduler have the ability to specify the desired weighting of OB flights relative to thru flights. Existing automated models are not flexible enough to "solve" the number reassignment problem. That is, flights are assigned numbers outside of the number pool or are classified as a thru flight or an OB flight when the flight does not qualify for this classification. Often, the automated heuristic model cannot solve a problem that could be solved manually. Moreover, using the automated heuristic model, each flight is assigned a number individually and sequentially relative to other flights. Once the flight number is assigned to a flight, the automated heuristic model does not revisit that flight even if a "better" number for that flight is later found or identified. Additionally, existing automated models do not provide optimization information, such as for example, the minimum number of numbers needed, do not provide flexibility to use mixed thru and OB pairings, do not provide the ability to provide a preference for thru or OB flights, do not provide an option to maximum the number of flights that keep their previously assigned number, and do not provide a output schedule that spans multiple days.

The two-stage optimization in the system 10 significantly reduces the time required to generate the flight number output schedule 85 and/or the output statistics 90. That is, the system 10 reduces the computation time (compared to a single-stage optimization) of a computer used to compute the flight number output schedule 85. As noted above, while previous methods took months or weeks to produce a less than optimal flight number schedule, the system 10 produces an optimized schedule in much less time, such as less than 4 days, less than 3 days, less than 2 days, less than 1 day, less than 12 hours, less than 6 hours, less than 4 hours, less than 2 hours, less than 1 hour, or mere seconds. Moreover, the system 10 requires significantly less memory than a single-stage optimization method to produce or output the flight number output schedule. As such, the system 10 reduces the processing load of a computer on which the two-stage optimization model is run, compared to a single-stage optimization model that generates a flight number output schedule. Reducing the processing load of the computer generally improves the performance of the computer such that the available memory of the computer is increased, the processing capacity of the computer is increased, and the processing speed of the computer is increased. Thus, the system 10 improves the functioning of the computer itself. That is, the system 10 results in specific improvements in computer capabilities (i.e., reduction of computation time, reduction of required memory, and reduction of processing load). Moreover, due to the decreased amount of time required to generate the flight number output schedule, the scheduler is able to execute the system 10 multiple times for one scheduling period thereby being provided a variety of flight number output schedules for the one scheduling period, with each having a different weight of OB/thru flights using the slideable scale 235. Thus, the scheduler may pick from a variety of optimal flight number output schedules for the one scheduling period.

The addition of the slideable scale 235 being displayed on the GUI 15*a* transforms the GUI 15 to a specific, structured GUI 15 that is paired with a prescribed functionality (slideable scale of OB/thru weight) that is directly related to a specifically identified problem in the prior art (inability to view and change the OB/thru weight).

Figure 18:
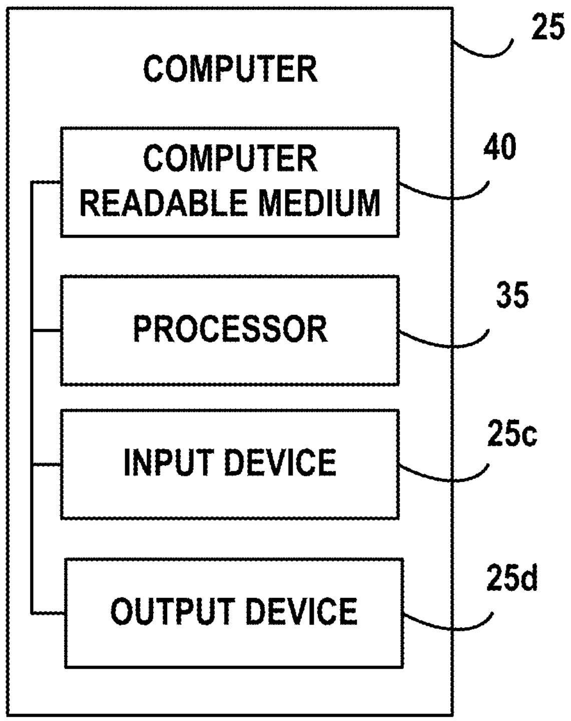
FIG. 18 is a diagrammatic illustration of the computer of FIG. 1, according to an example embodiment.

In an example embodiment, as illustrated in FIG. 18 with continuing reference to FIG. 1, the computer 25 includes the computer readable medium 40, the processor 35, an input device 25*c*, and an output device 25*d*. In an example embodiment, instructions accessible to, and executable by, the processor 35 are stored in the computer readable medium 40. In an example embodiment, the input device 25*c* is a keyboard, mouse, microphone, or other device coupled to the computer 25 that sends instructions to the computer 25. In an example embodiment, the input device 25*c* and the output device 25*d* include a graphical display, which, in several example embodiments, is in the form of, or includes, one or more digital displays, one or more liquid crystal displays, one or more cathode ray tube monitors, and/or any combination thereof. In an example embodiment, the output device 25*d* includes a graphical display, a printer, a plotter, and/or any combination thereof. In an example embodiment, the input device 25*c* is the output device 25*d*, and the output device 25*d* is the input device 25*c*. In several example embodiments, the computer 25 is, or includes, a telephone, a personal computer, a personal digital assistant, a cellular telephone, other types of telecommunications devices, other types of computing devices, and/or any combination thereof. In several example embodiments, the computer 25 includes a plurality of remote user devices. In an example embodiment, web browser software is stored in the computer readable medium 40.

In one or more example embodiments, an application is stored in the computer readable medium 40. In some embodiments, the application includes and/or executes one or more web-based programs, Intranet-based programs, and/or any combination thereof. In an example embodiment, the application includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous JavaScript and XML (Ajax), and/or any combination thereof. In an example embodiment, the application is a web-based application written in, for example, Java or Adobe Flex, which pulls real-time information from another computer and/or the plurality of data sources 20. In an example embodiment, the application pulls real-time information from the plurality of data sources 20, upon the execution, opening or start-up of the application. In an example embodiment, the application is stored on the computer readable medium 40 and/or in the database 45. In an example embodiment, the computer 25 may include a specially designed code, such as for example SAS code and/or UNIX. In an example embodiment, the SAS code allows communication with an external database, such as a database associated with one or more of the plurality of data sources 20.

In an example embodiment, the plurality of data sources 20 includes AA AirOps, Enterprise LDAP, AIRVision, CATS Crew Management, and/or one or more computer systems, host-based systems and/or applications thereof. Each of the plurality of data sources 20 may be stored on a computer that is similar or the same as the computer 25.

In an example embodiment, the network 30 includes the Internet, one or more local area networks, one or more wide area networks, one or more cellular networks, one or more wireless networks, one or more voice networks, one or more data networks, one or more communication systems, and/or any combination thereof.

Figure 19:
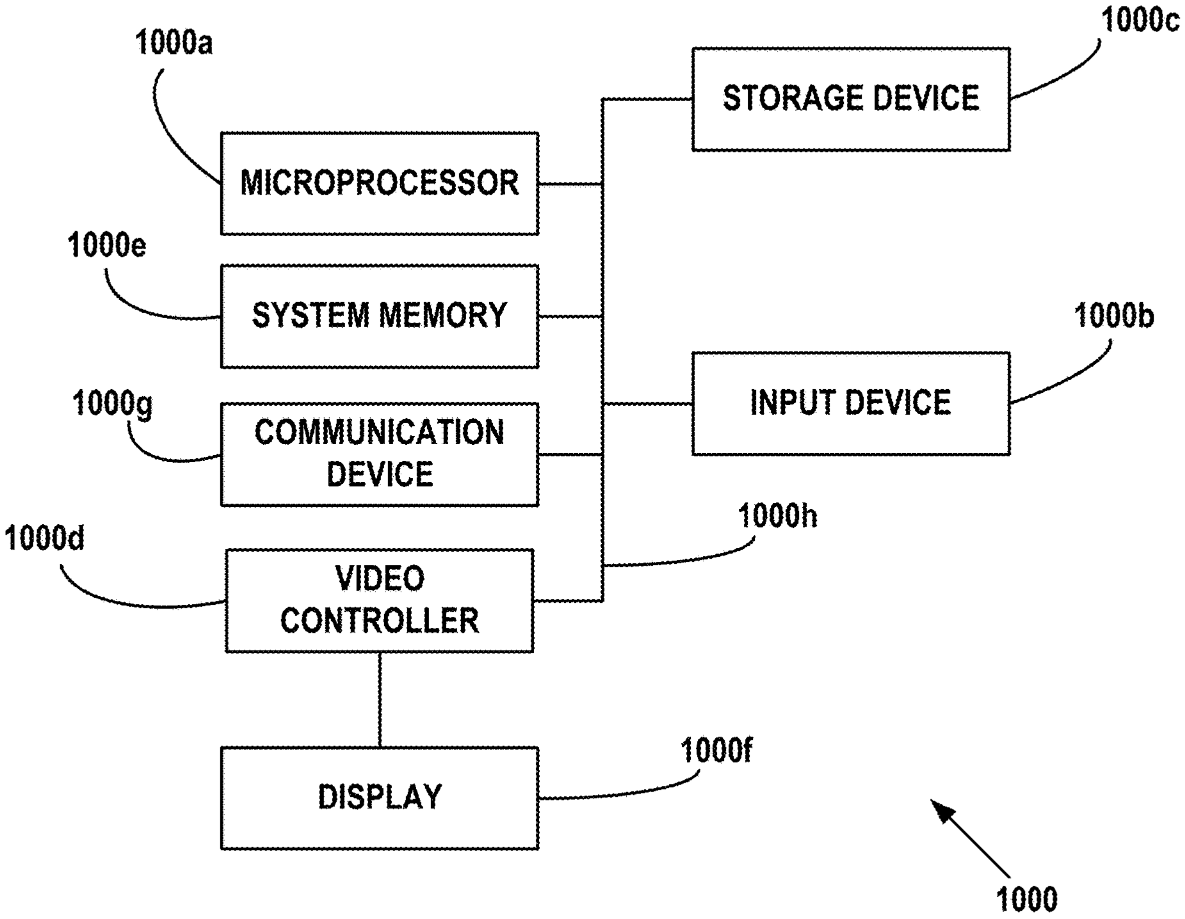
FIG. 19 is a diagrammatic illustration of a node for implementing one or more example embodiments of the present disclosure, according to an example embodiment.

In an example embodiment, as illustrated in FIG. 19 with continuing reference to FIGS. 1-8, 9*a*, 9*b*, and 10-18, an illustrative node 1000 for implementing one or more of the example embodiments described above and/or illustrated in FIGS. 1-8, 9*a*, 9*b*, and 10-18 is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several example embodiments, the storage device 1000*c* may include a floppy drive, hard drive, CD-ROM, optical drive, any other form of storage device and/or any combination thereof. In several example embodiments, the storage device 1000*c* may include, and/or be capable of receiving, a floppy disk, CD-ROM, DVD-ROM, or any other form of computer-readable medium that may contain executable instructions. In several example embodiments, the communication device 1000*g* may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones.

In several example embodiments, one or more of the components of the systems described above and/or illustrated in FIGS. 1-8, 9*a*, 9*b*, and 10-18 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-8, 9*a*, 9*b*, and 10-18 include respective pluralities of same components.

In several example embodiments, one or more of the applications, systems, and application programs described above and/or illustrated in FIGS. 1-8, 9*a*, 9*b*, and 10-18 include a computer program that includes a plurality of instructions, data, and/or any combination thereof an application written in, for example, Arena, HyperText Markup Language (HTML), Cascading Style Sheets (CSS), JavaScript, Extensible Markup Language (XML), asynchronous JavaScript and XML (Ajax), and/or any combination thereof a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of assigning a flight number to each flight in a plurality of flights using a flight number optimization model; wherein the flight number optimization model is configured to: classify each flight in the plurality of flights as one of: a thru flight that forms a portion of a multi-destination loop, an out-and-back flight that forms a portion of a two-flight loop, and a stand-alone flight that is neither a thru flight nor an out-and-back flight; and assign a flight number to each flight in the plurality of flights; wherein a flight classified as a thru flight shares a flight number with two or more other flights; wherein a flight classified as an out-and-back flight shares a flight number with only one other flight; and wherein a flight classified as a stand-alone flight does not share a flight number with another flight; wherein the method comprises: displaying, in a first window that is displayed on a graphical user interface, a slideable scale that receives a pairing preference input, wherein the pairing preference input indicates a user preference relating to the classification of flights in the plurality of flights as thru flights relative to the classification of flights in the plurality of flights as out-and-back flights; after displaying the first window, receiving by a processor, the pairing preference input via the slideable scale; in response to the receipt of the pairing preference input, classifying, using the flight number optimization model, each flight from the plurality of flights as one of: a thru flight, an out-and-back flight, and a stand-alone flight based on the pairing preference input received via the slideable scale; assigning, using the flight number optimization model, a flight number to each flight in the plurality of flights; wherein each assigned flight number is within a predetermined range of numbers; and displaying, in a second window that is displayed on the graphical user interface, at least a portion of an output schedule that comprises assigned flight numbers for flights in the plurality of flights. In one embodiment, the first window further displays a first file chooser adapted to select a reference schedule file; and the reference schedule file comprises a first listing of flights and a previously assigned flight number for each flight in the first listing of flights; the first window further displays a second file chooser adapted to select an input schedule file, the input schedule file comprises a second listing that comprises each flight in the plurality of flights; and the method further comprises: matching flights in the second listing with flights in the first listing; and in response to a match between the flights in the first listing and the flights in the second listings, associating the previously assigned flight numbers from the first listing to the matched flights in the second listing, respectively. In one embodiment, the first window further displays a maximum reference option and a minimum number option; the method further comprises, receiving by the processor, a selection command selecting either the maximum reference option or the minimum number option; assigning the flight number to each flight in the plurality of flights comprises: assigning, in response to receiving the maximum reference option, a maximum amount of previously assigned flight numbers that are associated with the flights in the first listing; and minimizing, in response to receiving the minimum number option, a total number of assigned flight numbers that are assigned to the flights in the second listing. In one embodiment, the method also includes determining, using the flight number optimization model, a minimum number of flight numbers needed to assign a flight number to each flight in the plurality of flights. In one embodiment, the method also displaying, in a third window that is displayed on the graphical user interface, the minimum number of flight numbers. In one embodiment, the slideable scale is configured to be a visual representation of the pairing preference input relative to first and second opposing preferences, wherein the first preference is on one end of the slideable scale and represents a preference for thru flight classification over out-and-back flight classification, and wherein the second preference is on an opposing end of the slideable scale and represents a preference for out-and-back flight classification over thru flight classification. In one embodiment, the pairing preference input that is received via the slideable scale is within an interval that extends between and includes the first and second opposing preferences. In one embodiment, the method also includes identifying, using the flight number optimization model, potential pairing(s) for each flight in the plurality of flights, wherein the potential pairings include potential thru pairing(s) and potential out-and-back pairing(s), wherein a potential thru pairing is a pairing of more than two flights that form a multi-destination loop, wherein each destination within the multi-destination loop is a destination location for one of the more than two flights and a departure location for another of the more than two flights; and wherein a potential out-and-back pairing is a pairing of only two flights that form a two-flight loop, wherein a destination location of one flight is the departure location of the other flight. In one embodiment, the method also includes assigning to each flight in the plurality of flights either: one potential pairing from the identified potential pairing(s), thereby resulting in a classification of the flight as a thru flight or out-and-back flight; or a classification that the flight is a stand-alone flight. In one embodiment, the respective classification for all of the flights in the plurality of flights occurs simultaneously.

The present disclosure also introduces an apparatus adapted to assign a flight number to each flight in a plurality of flights using a flight number optimization model, wherein the flight number optimization model is configured to: classify each flight in the plurality of flights as one of: a thru flight that forms a portion of a multi-destination loop, an out-and-back flight that forms a portion of a two-flight loop, and a stand-alone flight that is neither a thru flight nor an out-and-back flight; and assign a flight number to each flight in the plurality of flights; wherein a flight classified as a thru flight shares a flight number with two or more other flights; wherein a flight classified as an out-and-back flight shares a flight number with only one other flight; and wherein a flight classified as a stand-alone flight does not share a flight number with another flight, the apparatus comprising: a non-transitory computer readable medium having stored thereon a plurality of instructions, wherein the instructions are executed with at least one processor so that the following steps are executed: displaying, in a first window that is displayed on a graphical user interface, a slideable scale that receives a pairing preference input, wherein the pairing preference input indicates a user preference relating to the classification of flights in the plurality of flights as thru flights relative to the classification of flights in the plurality of flights as out-and-back flights; after displaying the first window, receiving by a processor, the pairing preference input via the slideable scale; in response to the receipt of the pairing preference input, classifying, using the flight number optimization model, each flight from the plurality of flights as one of: a thru flight, an out-and-back flight, and a stand-alone flight based on the pairing preference input received via the slideable scale; assigning, using the flight number optimization model, a flight number to each flight in the plurality of flights; wherein each assigned flight number is within a predetermined range of numbers; and displaying, in a second window that is displayed on the graphical user interface, at least a portion of an output schedule that comprises assigned flight numbers for flights in the plurality of flights. In one embodiment, wherein the first window further displays a first file chooser adapted to select a reference schedule file; wherein the reference schedule file comprises a first listing of flights and a previously assigned flight number for each flight in the first listing of flights; wherein the first window further displays a second file chooser adapted to select an input schedule file, wherein the input schedule file comprises a second listing that comprises each flight in the plurality of flights; and wherein the instructions are executed with the at least one processor so that the following additional steps are executed: matching flights in the second listing with flights in the first listing; and in response to a match between the flights in the first listing and the flights in the second listings, associating the previously assigned flight numbers from the first listing to the matched flights in the second listing, respectively. In one embodiment, the first window further displays a maximum reference option and a minimum number option; the instructions are executed with the at least one processor so that the following additional steps are executed: receiving by the processor, a selection command selecting either the maximum reference option or the minimum number option; wherein assigning the flight number to each flight in the plurality of flights comprises: assigning, in response to receiving the maximum reference option, a maximum amount of previously assigned flight numbers that are associated with the flights in the first listing; and minimizing, in response to receiving the minimum number option, a total number of assigned flight numbers that are assigned to the flights in the second listing. In one embodiment, the instructions are executed with the at least one processor so that the following additional steps are executed: determining, using the flight number optimization model, a minimum number of flight numbers needed to assign a flight number to each flight in the plurality of flights. In one embodiment, the instructions are executed with the at least one processor so that the following additional steps are executed: displaying, in a third window that is displayed on the graphical user interface, the minimum number of flight numbers. In one embodiment, the slideable scale is configured to be a visual representation of the pairing preference input relative to first and second opposing preferences, wherein the first preference is on one end of the slideable scale and represents a preference for thru flight classification over out-and-back flight classification, and wherein the second preference is on an opposing end of the slideable scale and represents a preference for out-and-back flight classification over thru flight classification. In one embodiment, the pairing preference input that is received via the slideable scale is within an interval that extends between and includes the first and second opposing preferences. In one embodiment, the instructions are executed with the at least one processor so that the following additional steps are executed: identifying, using the flight number optimization model, potential pairing(s) for each flight in the plurality of flights, wherein the potential pairings include potential thru pairing(s) and potential out-and-back pairing(s), wherein a potential thru pairing is a pairing of more than two flights that form a multi-destination loop, wherein each destination within the multi-destination loop is a destination location for one of the more than two flights and a departure location for another of the more than two flights; and wherein a potential out-and-back pairing is a pairing of only two flights that form a two-flight loop, wherein a destination location of one flight is the departure location of the other flight. In one embodiment, the instructions are executed with the at least one processor so that the following additional steps are executed: assigning to each flight in the plurality of flights either: one potential pairing from the identified potential pairing(s), thereby resulting in a classification of the flight as a thru flight or out-and-back flight; or a classification that the flight is a stand-alone flight. In one embodiment, the respective classification for all of the flights in the plurality of flights occurs simultaneously.

It is understood that variations may be made in the foregoing without departing from the scope of the present disclosure. For example, instead of, or in addition to flight number assignments often conducted in the course of airline industry business, aspects of the present disclosure are applicable and/or readily adaptable to number assignments conducted in other industries, including rail, bus, cruise and other travel or shipping industries, rental car industries, hotels and other hospitality industries, entertainment industries, and other industries.

In several example embodiments, the elements and teachings of the various illustrative example embodiments may be combined in whole or in part in some or all the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of assigning a flight number to each flight in a plurality of flights using a flight number optimization model;

wherein the flight number optimization model is configured to:

classify each flight in the plurality of flights as one of: a thru flight that forms a portion of a multi-destination loop, an out-and-back flight that forms a portion of a two-flight loop, and a stand-alone flight that is neither a thru flight nor an out-and-back flight; and after classifying each flight in the plurality of flights, assign a flight number to each flight in the plurality of flights;

wherein a flight classified as a thru flight shares a flight number with two or more other flights;

wherein a flight classified as an out-and-back flight shares a flight number with only one other flight; and wherein a flight classified as a stand-alone flight does not share a flight number with another flight;

wherein the method comprises:

displaying, in a first window that is displayed on a graphical user interface, a slideable scale that receives a pairing preference input, wherein the pairing preference input indicates a user preference relating to the classification of flights in the plurality of flights as thru flights relative to the classification of flights in the plurality of flights as out-and-back flights;

after displaying the first window, receiving by a processor, the pairing preference input via the slideable scale;

in response to the receipt of the pairing preference input, classifying, using the flight number optimization model, each flight from the plurality of flights as one of: a thru flight, an out-and-back flight, and a stand-alone flight based on the pairing preference input received via the slideable scale;

assigning, using the flight number optimization model and the processor and based on flight number rules, a flight number to each flight in the plurality of flights;

wherein the flight number rules comprise:

a rule providing that each flight number should be within a predetermined range of numbers; and a rule providing that each flight number should not be a restricted flight number, which is a flight number that is within the predetermined range of numbers and that is not available for assignment; and wherein each assigned flight number is within the predetermined range of numbers and is not a restricted flight number; and displaying, in a second window that is displayed on the graphical user interface, at least a portion of an output schedule that comprises assigned flight numbers for flights in the plurality of flights.

2. The method of claim 1, wherein the first window further displays a first file chooser adapted to select a reference schedule file;

wherein the reference schedule file comprises a first listing of flights and a previously assigned flight number for each flight in the first listing of flights;

wherein the first window further displays a second file chooser adapted to select an input schedule file, wherein the input schedule file comprises a second listing that comprises each flight in the plurality of flights; and wherein the method further comprises:

matching flights in the second listing with flights in the first listing; and in response to a match between the flights in the first listing and the flights in the second listings, associating the previously assigned flight numbers from the first listing to the matched flights in the second listing, respectively.

3. The method of claim 2, wherein the first window further displays a maximum reference option and a minimum number option;

wherein the method further comprises, receiving by the processor, a selection command selecting either the maximum reference option or the minimum number option;

wherein assigning the flight number to each flight in the plurality of flights comprises:

assigning, in response to receiving the maximum reference option, a maximum amount of previously assigned flight numbers that are associated with the flights in the first listing; and minimizing, in response to receiving the minimum number option, a total number of assigned flight numbers that are assigned to the flights in the second listing.

4. The method of claim 1, further comprising determining, using the flight number optimization model, a minimum number of flight numbers needed to assign a flight number to each flight in the plurality of flights.

5. The method of claim 4, further comprising displaying, in a third window that is displayed on the graphical user interface, the minimum number of flight numbers.

6. The method of claim 1, wherein the slideable scale is configured to be a visual representation of the pairing preference input relative to first and second opposing preferences, wherein the first preference is on one end of the slideable scale and represents a preference for thru flight classification over out-and-back flight classification, and wherein the second preference is on an opposing end of the slideable scale and represents a preference for out-and-back flight classification over thru flight classification.

7. The method of claim 6, wherein the pairing preference input that is received via the slideable scale is within an interval that extends between and includes the first and second opposing preferences.

8. The method of claim 1, further comprising identifying, using the flight number optimization model, potential pairing(s) for each flight in the plurality of flights, wherein the potential pairings include potential thru pairing(s) and potential out-and-back pairing(s), wherein a potential thru pairing is a pairing of more than two flights that form a multi-destination loop, wherein each destination within the multi-destination loop is a destination location for one of the more than two flights and a departure location for another of the more than two flights; and wherein a potential out-and-back pairing is a pairing of only two flights that form a two-flight loop, wherein a destination location of one flight is the departure location of the other flight.

9. The method of claim 8, further comprising assigning to each flight in the plurality of flights either:

one potential pairing from the identified potential pairing(s), thereby resulting in a classification of the flight as a thru flight or out-and-back flight; or a classification that the flight is a stand-alone flight.

10. The method of claim 9, wherein the respective classification for all of the flights in the plurality of flights occurs simultaneously.

11. An apparatus adapted to assign a flight number to each flight in a plurality of flights using a flight number optimization model, wherein the flight number optimization model is configured to: classify each flight in the plurality of flights as one of: a thru flight that forms a portion of a multi-destination loop, an out-and-back flight that forms a portion of a two-flight loop, and a stand-alone flight that is neither a thru flight nor an out-and-back flight; and after classifying each flight in the plurality of flights, assign a flight number to each flight in the plurality of flights; wherein a flight classified as a thru flight shares a flight number with two or more other flights; wherein a flight classified as an out-and-back flight shares a flight number with only one other flight; and wherein a flight classified as a stand-alone flight does not share a flight number with another flight, the apparatus comprising:

a non-transitory computer readable medium having stored thereon a plurality of instructions, wherein the instructions are executed with at least one processor so that the following steps are executed:

displaying, in a first window that is displayed on a graphical user interface, a slideable scale that receives a pairing preference input, wherein the pairing preference input indicates a user preference relating to the classification of flights in the plurality of flights as thru flights relative to the classification of flights in the plurality of flights as out-and-back flights;

after displaying the first window, receiving by a processor, the pairing preference input via the slideable scale;

in response to the receipt of the pairing preference input, classifying, using the flight number optimization model, each flight from the plurality of flights as one of: a thru flight, an out-and-back flight, and a stand-alone flight based on the pairing preference input received via the slideable scale;

assigning, using the flight number optimization model and based on flight number rules, a flight number to each flight in the plurality of flights;

wherein the flight number rules comprise:

a rule providing that each flight number should be within a predetermined range of numbers; and a rule providing that each flight number should not be a restricted flight number, which is a flight number that is within the predetermined range of numbers and that is not available for assignment; and wherein each assigned flight number is within the predetermined range of numbers and is not a restricted flight number; and displaying, in a second window that is displayed on the graphical user interface, at least a portion of an output schedule that comprises assigned flight numbers for flights in the plurality of flights.

12. The apparatus of claim 11, wherein the first window further displays a first file chooser adapted to select a reference schedule file;

wherein the reference schedule file comprises a first listing of flights and a previously assigned flight number for each flight in the first listing of flights;

wherein the first window further displays a second file chooser adapted to select an input schedule file, wherein the input schedule file comprises a second listing that comprises each flight in the plurality of flights; and wherein the instructions are executed with the at least one processor so that the following additional steps are executed:

matching flights in the second listing with flights in the first listing; and in response to a match between the flights in the first listing and the flights in the second listings, associating the previously assigned flight numbers from the first listing to the matched flights in the second listing, respectively.

13. The apparatus of claim 12, wherein the first window further displays a maximum reference option and a minimum number option;

wherein the instructions are executed with the at least one processor so that the following additional steps are executed:

receiving by the processor, a selection command selecting either the maximum reference option or the minimum number option;

wherein assigning the flight number to each flight in the plurality of flights comprises:

assigning, in response to receiving the maximum reference option, a maximum amount of previously assigned flight numbers that are associated with the flights in the first listing; and minimizing, in response to receiving the minimum number option, a total number of assigned flight numbers that are assigned to the flights in the second listing.

14. The apparatus of claim 11, wherein the instructions are executed with the at least one processor so that the following additional steps are executed:

determining, using the flight number optimization model, a minimum number of flight numbers needed to assign a flight number to each flight in the plurality of flights.

15. The apparatus of claim 14, wherein the instructions are executed with the at least one processor so that the following additional steps are executed:

displaying, in a third window that is displayed on the graphical user interface, the minimum number of flight numbers.

16. The apparatus of claim 11, wherein the slideable scale is configured to be a visual representation of the pairing preference input relative to first and second opposing preferences, wherein the first preference is on one end of the slideable scale and represents a preference for thru flight classification over out-and-back flight classification, and wherein the second preference is on an opposing end of the slideable scale and represents a preference for out-and-back flight classification over thru flight classification.

17. The apparatus of claim 16, wherein the pairing preference input that is received via the slideable scale is within an interval that extends between and includes the first and second opposing preferences.

18. The apparatus of claim 11, wherein the instructions are executed with the at least one processor so that the following additional steps are executed:

identifying, using the flight number optimization model, potential pairing(s) for each flight in the plurality of flights, wherein the potential pairings include potential thru pairing(s) and potential out-and-back pairing(s), wherein a potential thru pairing is a pairing of more than two flights that form a multi-destination loop, wherein each destination within the multi-destination loop is a destination location for one of the more than two flights and a departure location for another of the more than two flights; and wherein a potential out-and-back pairing is a pairing of only two flights that form a two-flight loop, wherein a destination location of one flight is the departure location of the other flight.

19. The apparatus of claim 18, wherein the instructions are executed with the at least one processor so that the following additional steps are executed:

assigning to each flight in the plurality of flights either:

one potential pairing from the identified potential pairing(s), thereby resulting in a classification of the flight as a thru flight or out-and-back flight; or a classification that the flight is a stand-alone flight.

20. The apparatus of claim 19, wherein the respective classification for all of the flights in the plurality of flights occurs simultaneously.

* * * * *